United States Patent [19]

Koizumi et al.

[11] Patent Number: 5,778,333

[45] Date of Patent: Jul. 7, 1998

[54] BOUNDARY ROUTE SETTING DEVICE FOR A MAP DISPLAY SYSTEM

[75] Inventors: Satoru Koizumi, Chiryu; Masami Mikame, Okazaki, both of Japan

[73] Assignee: Nippondenso Co., Ltd., Kariya, Japan

[21] Appl. No.: 522,710

[22] Filed: Sep. 1, 1995

[30] Foreign Application Priority Data

Sep. 2, 1994 [JP] Japan ................... 6-209974

[51] Int. Cl.$^6$ ................... G06G 7/78
[52] U.S. Cl. ................... 701/212; 701/208; 340/995; 340/910
[58] Field of Search ................... 364/443, 449.1, 364/449.2, 449.3, 449.6, 449.5; 340/988, 990, 995, 909, 910, 917, 934; 73/178 R; 395/132, 121, 126, 127, 128; 342/357

[56] References Cited

U.S. PATENT DOCUMENTS

| | | | |
|---|---|---|---|
| 4,543,572 | 9/1985 | Tanaka et al. | 364/449.2 |
| 4,571,684 | 2/1986 | Takanabe et al. | 364/449.2 |
| 4,608,656 | 8/1986 | Tanaka et al. | 364/449.6 |
| 5,274,387 | 12/1993 | Kakihara et al. | 364/449.3 |
| 5,297,051 | 3/1994 | Arakawa et al. | 364/449.2 |
| 5,398,189 | 3/1995 | Inoue et al. | 364/449.2 |
| 5,408,415 | 4/1995 | Inou et al. | 364/449.2 |
| 5,550,743 | 8/1996 | Kyrtsos | 364/449.7 |

Primary Examiner—Jacques H. Louis-Jacques
Attorney, Agent, or Firm—Cushman Darby Cushman IP Group of Pillsbury Madison & Sutro LLP

[57] ABSTRACT

An intersection determination process determines the state of intersection of adjacent segments in a display such as one for a vehicle navigation system, and if it is determined that there is an is an intersection between the segments, an orientation-intersection point transformation value table is referred to for computation of the intersection transformation value. This table shows the relationship of the combination of the orientations of the previous segment and the present segment with an intersection point transformation value. This intersection point transformation value is added to the coordinates of the end point of the previous segment to obtain the intersection. The intersection point derived in this way is generated as data for traffic display. Because the above table is used in computing the intersection point, the intersection point is computed using a simple transformation process and a traffic display of good visibility is implemented without burdening the CPU and increasing the amount of data processed.

21 Claims, 13 Drawing Sheets

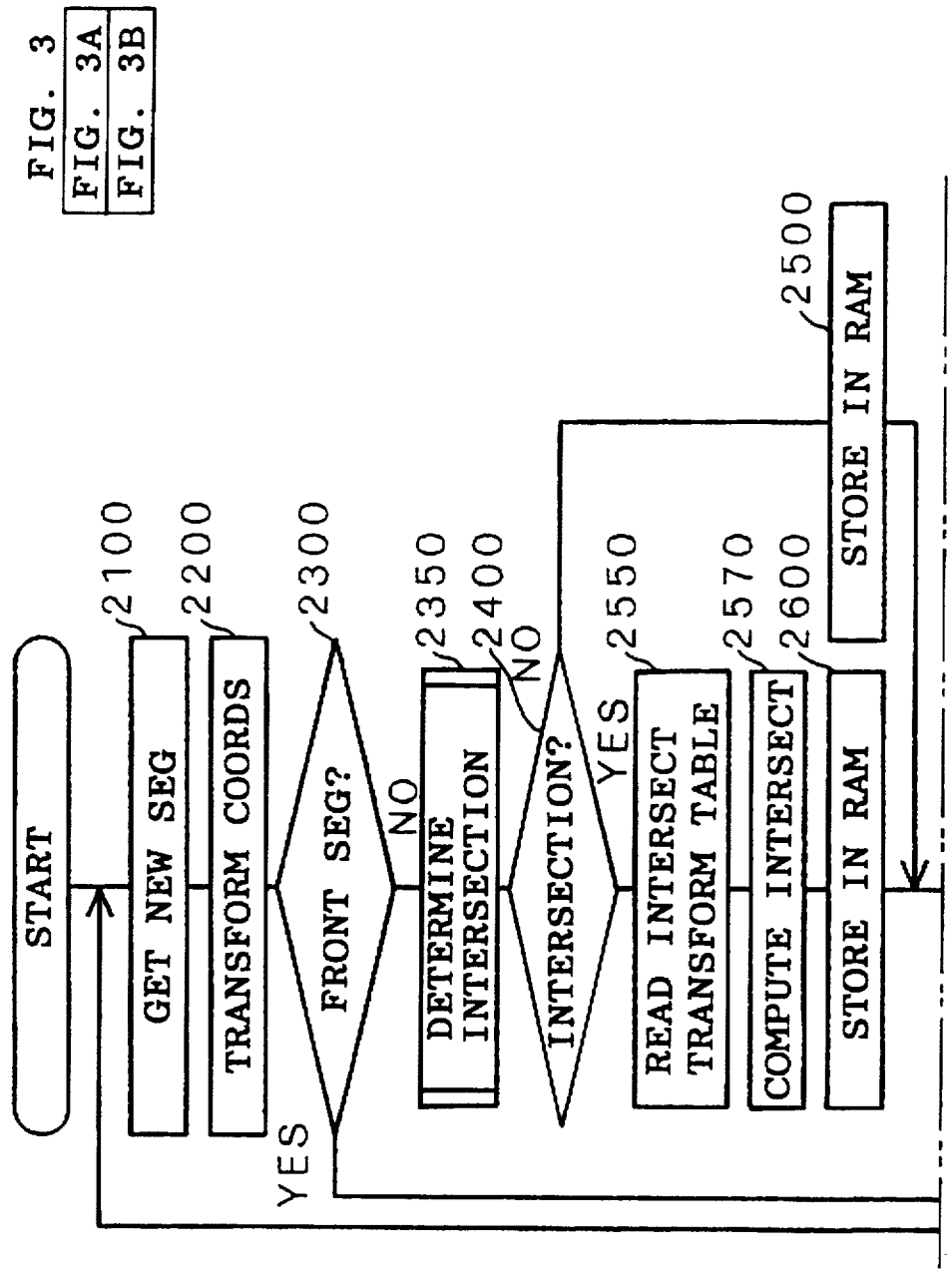

BOUNDARY ROUTE SETTING DEVICE FOR A MAP DISPLAY SYSTEM

CROSS-REFERENCE TO RELATED APPLICATION

This application is related to and claims priority from Japanese Patent Application No. Hei-6-209974, the contents of which are hereby incorporated by reference.

BACKGROUND OF THE INVENTION

1. Field of the Invention

The present invention relates to a boundary route setting device and a navigation apparatus. More specifically, the present invention relates to a boundary route setting device which sets boundary routes along roads showed by the navigation apparatus to show that the roads are traffic congested, and the navigation apparatus that uses the above boundary route setting device.

2. Description of the Related Art

A vehicle-mounted navigation device shows the present position of the vehicle in real-time on a map and supplies the driver with useful information for him to reach his desired destination. Also, there are systems which show the route to the destination on the map so that the driver reaches his destination without losing his way.

Further, other systems show displays based on information obtained regularly from FM stations or the like. For example, if there is a congested road, the FM station transmits the segment number of that road. After receiving the signals, the vehicle-mounted navigation device shows a display on the map to warn the driver. In response to this warning, the driver makes the necessary detours and thus this navigation system is convenient for efficient driving.

From the standpoint of visibility, one most desirable method of showing how traffic congested a road is by displaying a line that shows the traffic congestion along the road at a position that is at a predetermined distance to the left of the center line of the road (for left-handed traffic) while facing the direction of movement. To show a display like this, one implementation is to store beforehand data translated in parallel for displaying traffic to be shown to the left of the center line of the road.

However, this involves storing an enormous amount of data for all the roads separate from the database for displaying the map. Moreover, for this case, center road data and data that represents left and right parallel translations of the center of the road are needed and thus memory capacity is a problem because three times the amount of data needed for storing the regular map data has to be provided.

Although not prior art to this invention, the present inventors have determined that to implement a highly-visible display without preparing separate data for displaying traffic, there is a need to generate traffic display data through online transformation of the center road data. In one method that corresponds to this transformation process, each part of the line (segment) which form a road are translated in parallel in the same direction so that the road itself is translated in parallel. However, for this method, if the road is curved to a certain angle, e.g., the road is curved at an angle of over 90, even if some segments are displayed in the left side, other segments intersect with the original road. Still, some segments are displayed on the right side and thus perfect parallel translation and a display of good visibility are not achieved.

Another method developed by the inventors is to translate in parallel each line segment with reference to each of the corresponding original line segments. In this method, because fellow line segments which curve inward intersect after their parallel translation, their shapes have to be changed after determining that they intersect and after computing their intersection point. On the other hand, because fellow line segments which curve outward part from each other after parallel translation, the connectivity of these line segments needs to be checked after their parallel translation. For this case, the necessary complicated calculations involving floating decimal points represent burdens to the navigation device and thus, this method is not suitable for inexpensive and low-function integrated-type navigation devices.

This problem is not only limited to the traffic display case but it also occurs when boundaries are shown along target roads to distinguish them from the other roads.

SUMMARY OF THE INVENTION

In view of the foregoing problems, it is a goal of the present invention to provide a boundary route setting device and a navigation device that provides a display of good visibility through simple processing of the original road data without increase in the amount of data.

To achieve these aims, as shown in FIG. 17, one aspect of the present invention provides a boundary setting section for setting the coordinates of a boundary shown along a target route to make the desired target route displayed by a display unit distinguishable from the other routes which includes an orientation computation section which computes the orientations of the zones which form the above target route in terms of a predetermined number of discrete orientations, an orientation-intersection point transformation value table provided for every combination of adjacent zones having two orientations by computing the intersection point transformation value used for computing the intersection point after parallel translation of each zone to the display position of the boundary, an intersecting/separate state determination section for determining whether the zones that results after the parallel translation of adjacent zones to the display position of the boundary are intersecting or separate, the above adjacent zones having two orientations as computed by the orientation computation section among adjacent zones that form the target route, an intersection transformation value detection section for computing the intersection transformation value for the adjacent zones having two orientations based on the orientation-intersection point transformation value table after the intersecting/separate state determination section determines that the combination of two orientations of adjacent zones produces an intersection point, an intersection point coordinate computation section which sets as a boundary route coordinate one coordinate obtained after transforming, using the intersection transformation value computed through the intersection point transformation value detection section, the coordinates of one of two end points of the border of two adjacent zones after the intersecting point/separated state determination section determines that these combination of adjacent zones having two orientations would cause zone intersection, a separation end point coordinate computation section for setting as the boundary coordinate the two coordinates after parallel translation of the border of two adjacent zones to the display position of the boundary of the two end points after the intersection/separate state determination section determines that the adjacent zones having two orientations would cause a separated state and a coincidence point coordinate computation section for setting as the boundary coordinate one coordinate obtained after the parallel translation of one coordinate of one of two end points of the border of two adjacent sides after the intersecting/separation state determination section determines that the combination of adjacent zones having two orientations cause neither intersecting nor separate states.

In this way, the provision of the orientation-intersection point transformation value table which is obtained by computing the intersection of each general combination of adjacent zones having two orientations after their parallel translation to the display positions of the each of their boundary routes removes the burden of boundary route computations.

In other words, during the computation of the coordinates that form the boundary route, the intersection/separate state determination section determines if the combination of adjacent zones of two orientations obtained using the orientation computation section intersects or separates or does neither after the parallel translation of each zone to the display position of their respective boundary routes. The process performed by the orientation computation section merely involves the simple process of identifying a predetermined number of discrete orientations (for example, eight orientations). The process performed by intersection/ separated state determination section is a simple one which involves determining if intersections or separations occur but not the computation of the intersection point.

Furthermore, the process of determining the coordinates which correspond to the actual intersection is not just solely a computation process wherein at first, the intersection transformation value detection section determines the intersection transformation value of adjacent zones of two orientations using the orientation/intersection transformation value table. This orientation/intersection transformation value is used for computing the intersection of the route for each general combination of adjacent zones of two orientations generated after parallel translation of each zone to the display position of each boundary route. Therefore, based on this orientation/intersection transformation value, the boundary coordinates which correspond to the actual intersection is derived through simple transformation operations (for example, addition and substraction) performed by the intersection coordinate computation section on the coordinates of one of two end points of the common border of two adjacent zones.

Also, the boundary route coordinates for zones that separate is derived as two boundary coordinates which correspond to the end points when the separate end point coordinate computation section moves the coordinates of the two end points of the common border of the two adjacent zones to the display position of the boundary route.

Furthermore, boundary route coordinates which do not intersect or separate are derived as the boundary coordinates that correspond to the end point when the coincidence end point coordinate computation section moves the coordinates of one of the end points of the common border of the adjacent zones to the display position of the boundary route.

The processes of the separate end point coordinate computation and coincidence end point coordinate computation sections are simple coordinate translation processes. Thus, as a whole, the coordinates for drawing the boundary route are generated in a simple manner and accordingly, there is no need to prepare data for the boundary route pattern beforehand and the necessary boundary route can be formed orderly on one side of the target route. In this way, a boundary route display of good visibility is implemented with almost no increase in the amount of display data and processing load.

A further aspect of the present invention provides a boundary setting device wherein the intersection/separated state determination section furthermore determines that there are no intersections nor separations if the difference in the non-discrete orientations falls below a predetermined value even if the combination of two discrete orientations computed using the orientation computations of adjacent zones among zones that form the target route intersect or separate.

In this way, the above intersection/separated state determination section can decide that there are no intersections nor separations if the differences in the non-discrete orientations falls below a predetermined value for adjacent zones that are part of the target route even if the orientation computation section determines that these adjacent zones having two orientations intersect or separate.

Here, the orientation computation device computes for the orientation of the zones in terms of a predetermined number of discrete orientations. Accordingly, since there is a border which sets the boundary between two orientations, then there are cases when the computed discrete orientations for two orientations differ despite the fact that their actual orientations are almost the same. Therefore, even if two zones whose non-discrete orientation difference falls below a predetermined value intersect, the position of the intersection is almost no different from the position of the end point of the zone when translated to the display position of the boundary route. Thus, even if the boundary route coordinate which corresponds to the end point is not computed using the orientation-intersection transformation value table, intersection transformation value determination and intersection coordinate computation sections, computation of the boundary route coordinate corresponding to the end point using the coincidence end point coordinate computation section by transferring the coordinate of one of two end points of the common border between the adjacent zones to the display position of the boundary route results in lesser burden in the processing.

Another aspect of the present invention provides a boundary setting device having a both side intersecting state determination section for determining whether or not there are intersections in both sides of zones among the zones that form the target route after substantial parallel translation of each zone to the position of the boundary, a zone length determination section for determining whether or not the length of a zone which forms the target route falls below a predetermined length, and a zone concealment section for treating as non-existent a zone according to the construction of the first embodiment wherein the zone determined to cause intersection at both sides is determined by the zone length determination section to have a length below a predetermined length.

In this way, if intersections occur at both borders of a zone that is bordered by two zones after the nearly parallel translation of each of the zones to the display position of the boundary route, in other words, if both zones which border that zone on both sides are curved inward, then if the length of the surrounded zone falls below a predetermined value, the interval between the intersections with the bordering zones becomes shorter or disappears. Thus, if this kind of situation is determined by the both side intersect state determination section and the zonal length determination sections, the zonal concealment section prevents the unnecessary generation of coordinates or simplifies the coordinates by treating the zone as non-existent. Thus, the boundary route is displayed more clearly and processing is faster.

A yet further aspect of the present invention provides a boundary setting device which, in place of the separate end point coordinate computation section, includes an orientation-extended intersection point transformation value table provided by computing beforehand for every combination of adjacent zones having two orientations the extended intersection point transformation value used in computing the route intersection after parallel translation of each zone to display position of the boundary and the elongation of the zone length, an extended point transformation value detection section for determining the extended intersection point transformation value from adjacent zones having two orientations based on the orientation-extended intersection point transformation value after the intersection/separate state determination section determines that the adjacent zones of two orientations have separate zones, and an extended point coordinate computation section for setting as the boundary coordinate the coordinate obtained by transforming the coordinate of one of two end points of adjacent zones using the extended point transformation value computed using the extended point transformation value determination section after the intersection/separate state determination section determines that the combination of adjacent zones having two orientations results in a separated state.

In the previous aspects, if separation occurs after substantial parallel translation of the zones, the two boundary coordinates are derived by transferring the two end points of the common border of two adjacent zones to the display position of the boundary route. However, while the end points of the zones part from each other after parallel translation, an intersection can be derived by extending the zone to the common border side. Thus, if this intersection is employed as the coordinate of the boundary route, the coordinate of the boundary route can be derived in the same process as that of the intersection transformation value detection and intersection coordinate computation sections.

Thus, an orientation-extended intersection transformation value table is provided by computing beforehand for every general combination of adjacent zones having two orientations the extended intersection point transformation value used in computing the route intersection after parallel translation of each zone to display position of the boundary and elongation of the zone length, together with the extended intersection transformation value determination section computing the extended intersection transformation value of the adjacent zones having two orientations based on the orientation-extension intersection transformation value table when the intersection/separation state determination section determines that the combination of adjacent zones having two orientations produces a separated state, and the extended intersection coordinate computation section setting as the boundary route coordinate the coordinate derived after using the extended intersection transformation value computed using the extended intersection transformation value detection section to transform the coordinates of one for the end points of the common border of two adjacent zones after the intersection/separated state determination section determines that the combination of adjacent zones produces a separated state. Accordingly, the orientation-intersection transformation value table for cases of simple intersection and the orientation-extended intersection transformation value table can be unified and the processes of the intersection transformation value determination section and the intersection coordinate computation section, and the extended intersection transformation value detection section and extended intersection coordinate computation section standardized to cut back on memory used for storing programs in the processing side, the various parameters or the like, and thus this leads to the simplification of the device.

Moreover, another aspect of the present invention provides a boundary setting device for setting the coordinates of a boundary shown along a target route to make the desired target route displayed by a display section distinguishable from the other routes which includes an orientation computation section for computing the orientations of the zones which form above target route in terms of discrete orientations, an orientation-coordinate transformation value table established by computing for each combination of adjacent zones having two orientations, the coordinate transformation value for the computation of the coordinates needed to form both zones continuously after parallel translation of both zones to the display position of the boundary, a coordinate transformation value detection section for determining the coordinate transformation value from the two orientations of the neighboring zones using the orientation-coordinate transformation value table, and a boundary coordinate computation section for setting as the boundary coordinate the coordinate obtained after transforming the coordinate of one of two end points of the border of two adjacent zones using the orientation-coordinate value computed through the coordinate transformation value detection section.

In this way, the coordinates of the boundary route is computed for all combinations of adjacent zones having two orientations using the same simple process. Therefore, memory for storing the programs of the processing side, various parameters or the like is saved and the structure of the device is simplified.

Also, the intersection coordinate computation, the extended intersection coordinate computation, and boundary route coordinate computation sections can set as the object for transformation the end points of the zone after its substantial parallel translation to the position of the boundary route. In other words, the intersection coordinate computation, the extended intersection coordinate computation, and boundary route coordinate computation sections can also have points other than the end points of the zones as their object of transformation and by adjusting the orientation-intersection transformation value, intersection-extended intersection transformation value and orientation-coordinate value tables, the end point of a translated zone after its parallel translation to the display position of the boundary route can also be set as the object of transformation.

In still another aspect of the present invention, a boundary setting device is provided wherein the intersection coordinate computation section, the extended intersection point coordinate computation section or the boundary coordinate computation section sets the coordinate of an end point of a zone after parallel translation of the zone to the display position of the boundary.

A yet further aspect of the present invention provides a navigation device having a boundary setting device and a display section for displaying boundary routes after successively connecting the boundary coordinates computed using the intersection coordinate computation section, boundary coordinates computed using the separation end point coordinate computation section or the extended intersection point coordinate computation section and boundary coordinates computed using the coincidence end point coordinate computation section.

In this way, a navigation device having a display of good visibility is realized through the simple processing of original route data with almost no increase in the amount of needed data.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Preferred embodiments of the present invention are hereinafter described with reference to the accompanying drawings.

Figure 1:
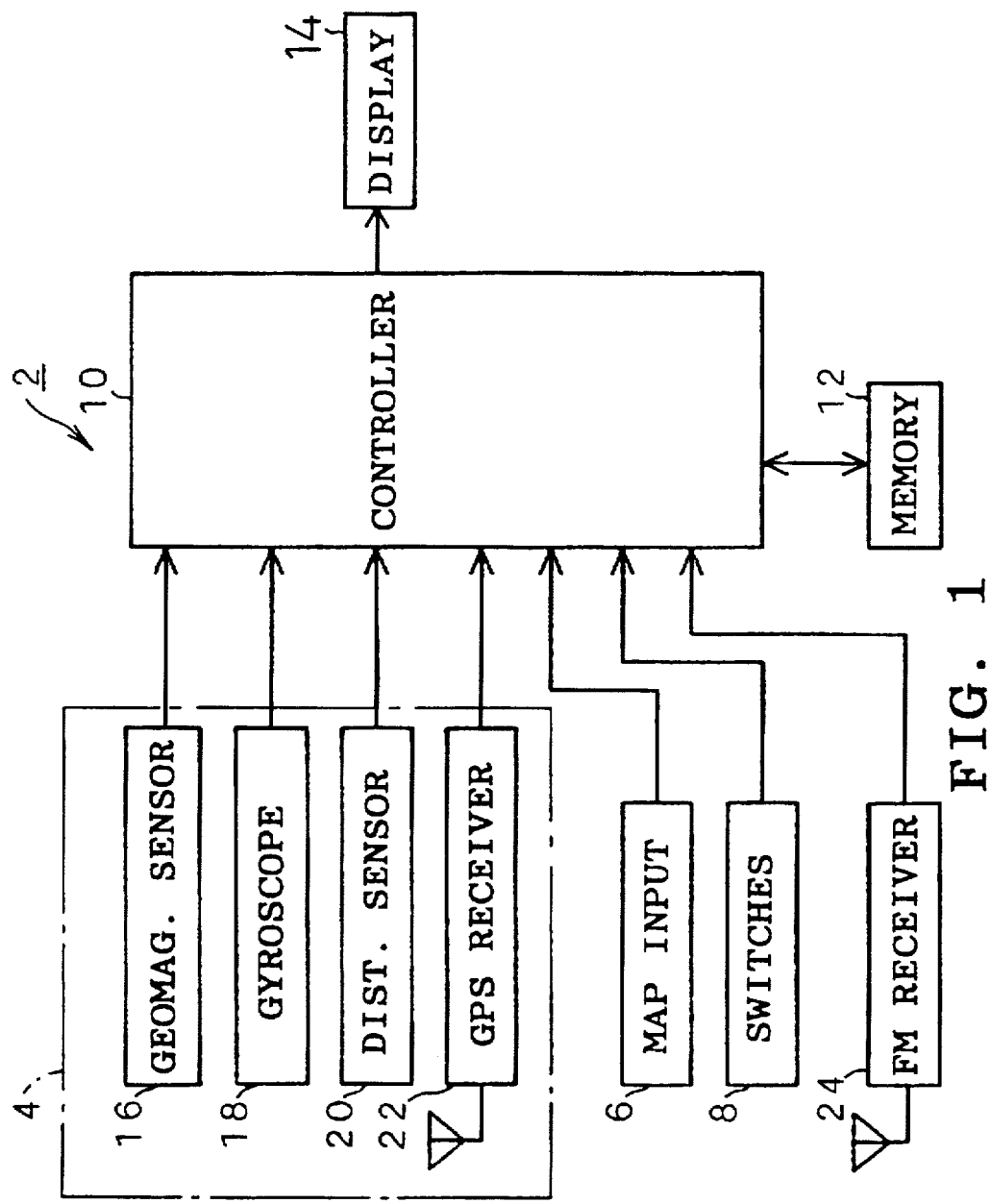
FIG. 1 is a block diagram showing the overall construction of a car-mounted navigation device according to a first embodiment of the present invention.

FIG. 1 is a block diagram showing the entire construction of a vehicle-mounted device according to a first embodiment of the present invention. Navigation device 2 has a position detector 4, a map data input unit 6, a group of operation switches 8, a controller 10 connected to all of these, an external memory unit 12 connected to controller 10, and a display unit 14. External memory unit 12 is for temporarily storing various types of data such as map data from map data input unit 6, road guide data or the like, and is constructed from RAMs and buffers. Controller 10 which is constructed like a regular microprocessor includes a CPU, ROM, RAM, I/O units and bus lines which connect all of these units.

Position detector 4 includes a vicinity geomagnetic sensor 16, a gyroscope 18, a distance sensor 20 and a GPS (Global Positioning System) receiver unit 22 for detecting the position of the vehicle based on radio waves from a satellite.

Because each of the sensors 16, 18, 19, 20 has inaccuracies of a nature different from the others, these multiple sensors are constructed to complement each other during use. However, there is no need to use all of these sensors and it might be that only some sensors are used according to the required precision. Furthermore, steering rotational sensors, rolling vehicle wheel sensors or the like may also be used. Map data input unit 6 receives data including map matching data, road guides, map data and the like for improving position detection accuracy of the system. With the amount of data involved, CD-ROMs are generally used as the medium for conveying such data. Of course, other media such as memory cards may also be used.

A commonly-known navigation device includes a position detector 4, a map input unit 6, a group of switches 8, a controller 10, a display unit 14 and the like. Display unit 14 superimposes the position information provided by the position detector 4 on the map data provided by the map data input unit 6. The vehicle-mounted navigation device 2 has a commonly-known route guide function wherein the guide route is displayed after forming the cruising route by connecting intermediate points between the present position and the destination using straight lines after entering the destination including the intermediate points through the group of operation switches 8. Touch switches which are integrated into the display unit, mechanical switches or the like are used for the group of switches 8 used for the various inputs.

Furthermore, the navigation device 2 includes an FM receiver 24 which receives various kinds of information regarding transportation, especially traffic information. Controller 10 receives this traffic information and based on the road code included in the traffic information, it shows a traffic display along the corresponding road if the map the display unit 14 is showing includes the road having that road code.

Following the predetermined initial setting after actuating the power switch of vehicle-mounted navigation device 2, the desired process is chosen from among the processes of the traffic information display device and is then executed. Here, the driver of the automobile who is about to start driving chooses the route setting process to make the display unit 14 show the guide route, sets the route using the group of switches 8 and after which, the display unit 14 displays the map of the surroundings of the set area. The established guide route and the present position of the vehicle are superimposed. The driver begins driving towards the destination while checking the present position and the guide route. While driving, the controller 10 of navigation apparatus 2 detects the cruising direction and cruising speed using the position detector 4, derives the track covered, performs the process of moving the present position mark on the map and furthermore, compares (pattern matching) the road pattern on the map and the covered track derived by the position detector 4 at predetermined timing to perform the necessary compensation process for displaying the present position.

The controller 10 displays traffic based on the traffic information received from the FM station through the FM receiver 24 simultaneously with the above processes. The flowchart of FIG. 2 shows the traffic display process.

Figure 2:
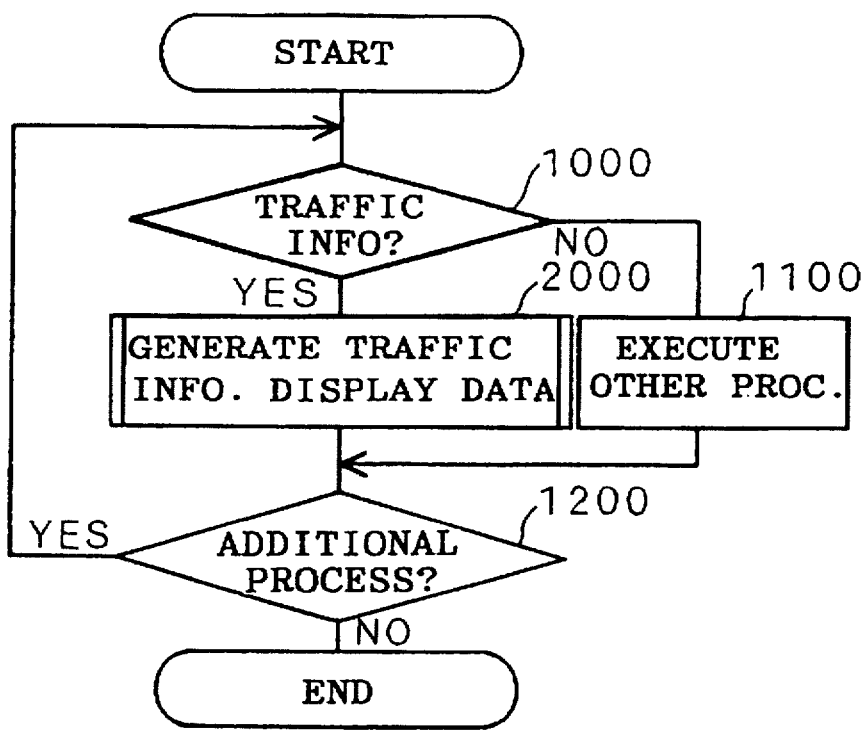
FIG. 2 is a flowchart of FM wave traffic information processing according to the first embodiment.

FIG. 2 shows the received FM signal traffic information processing procedure performed when FM receiver 24 receives traffic information signals from the FM station. In step 2000, a traffic information display data generation process to be explained later is performed if the received signal contains traffic information. In step 1100, the corresponding processes are performed when the received signal contains information relevant to processes other than the traffic information process. For example, if the contents of the received signal state that traffic has eased up, then in step 1100, the process of removing the traffic display data of the corresponding road is executed.

If either of the processes of steps 2000 or 1100 ends, step 1200 determines if there are still some leftover processes to be executed using the contents of the received signal. If there are still some remaining processes, then execution is performed again starting from step 1000. If all the processes finish, the received FM signal traffic information process terminates.

Figure 3B:
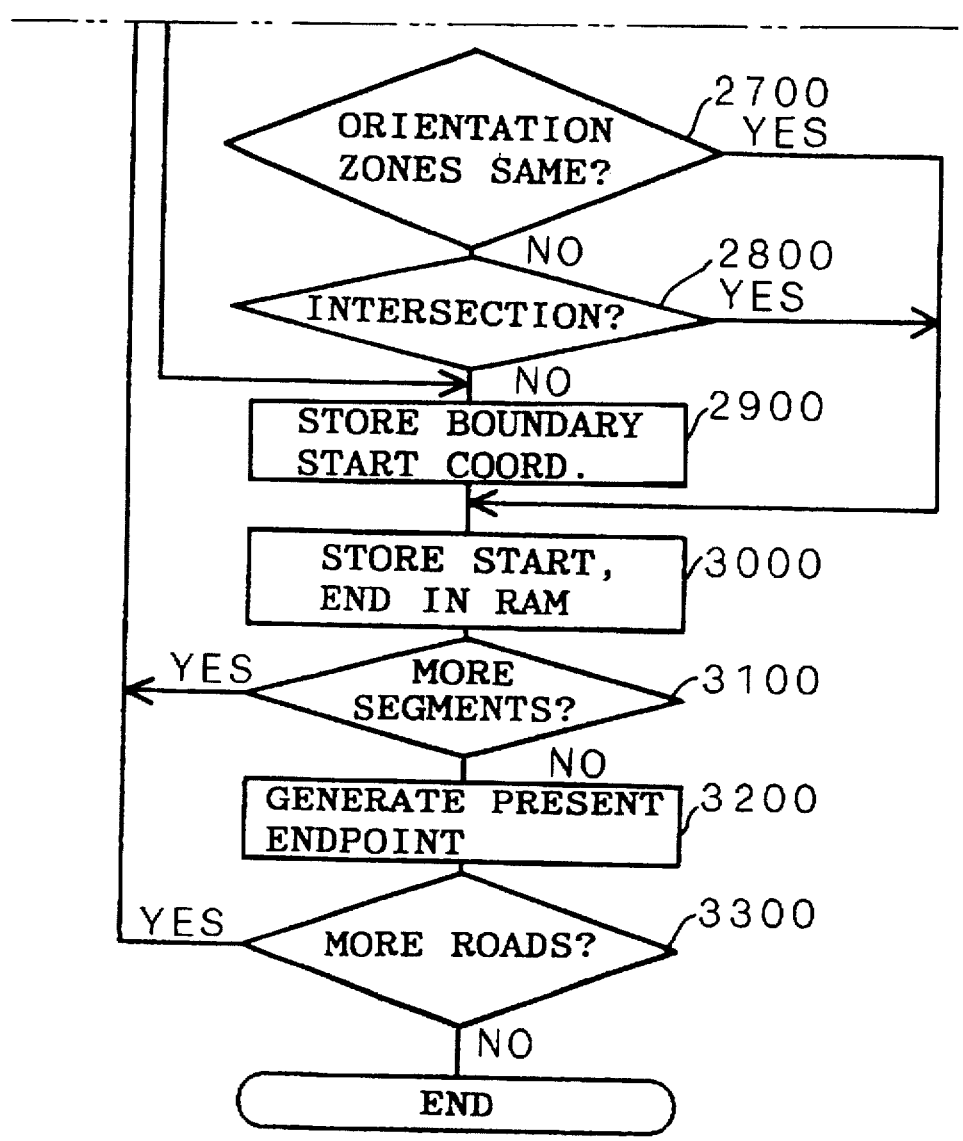
FIG. 3, comprising of FIGS. 3A and 3B, is a flowchart showing a traffic display data generation process according to the first embodiment.

Next, the traffic display data generation process of step 2000 is explained using the flowchart shown in FIG. 3.

When processing commences, based on the road code contained in the traffic information from the FM station, step 2100 searches for the entry position of the data corresponding to the appropriate road in the map data of external memory unit 12 and obtains the coordinate data of a new segment which is stored in the entry position and which forms the appropriate road.

Figure 5:
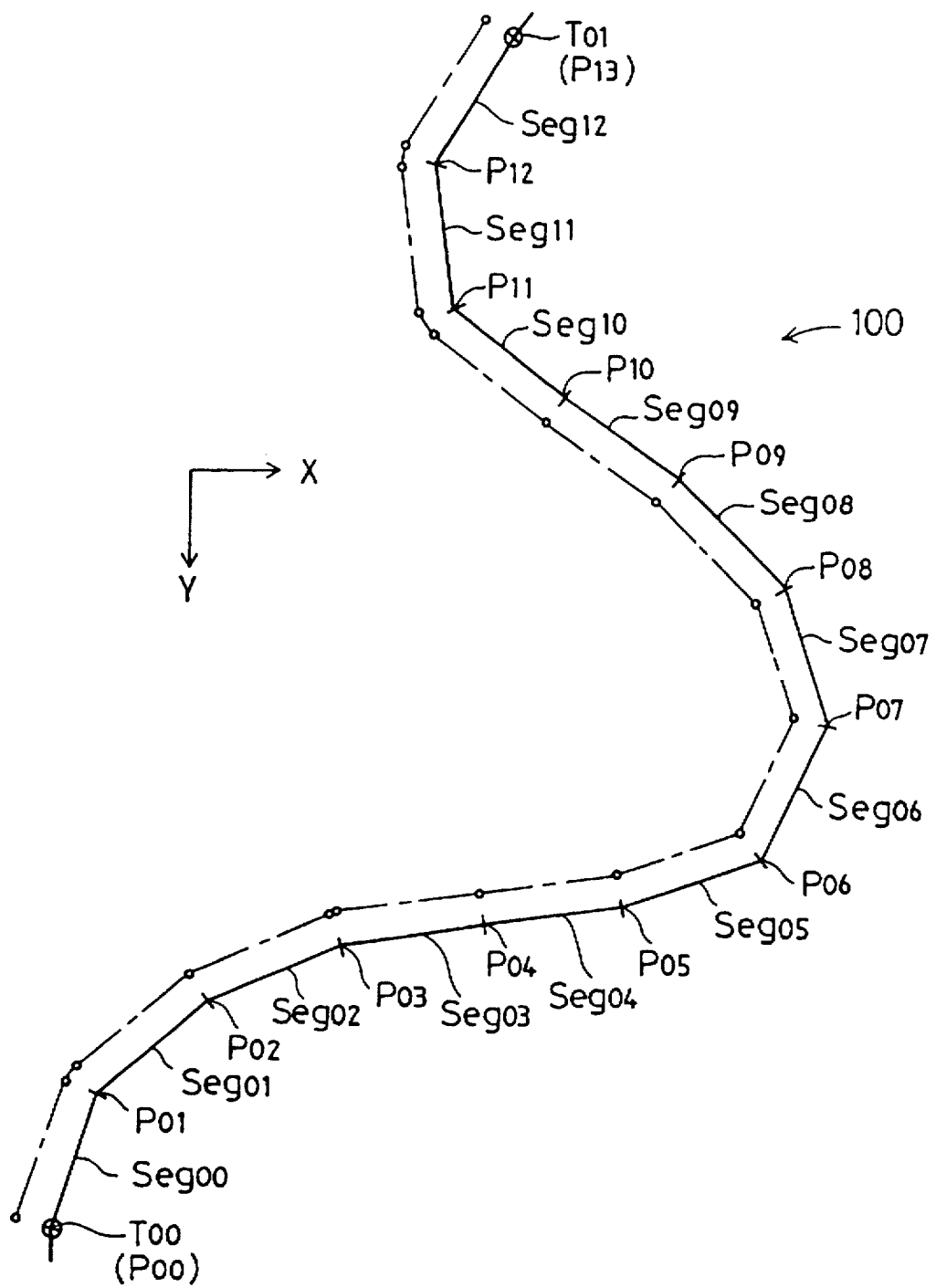
FIG. 5 is an explanatory drawing showing the segment structure of a road and a traffic display example.

Normally, each road has several segments. For example, FIG. 5 shows in solid lines the segments which form a road 100 which is contained in the traffic information. This road is the road on the left side when proceeding from intersection T00 to intersection T01. While its counterpart road is the road on the right side, here, only the road on the left side when proceeding from intersection T00 to intersection T00 is explained. This road 100 is made up of 13 segments which are Seg00 to Seg12.

Figure 6:
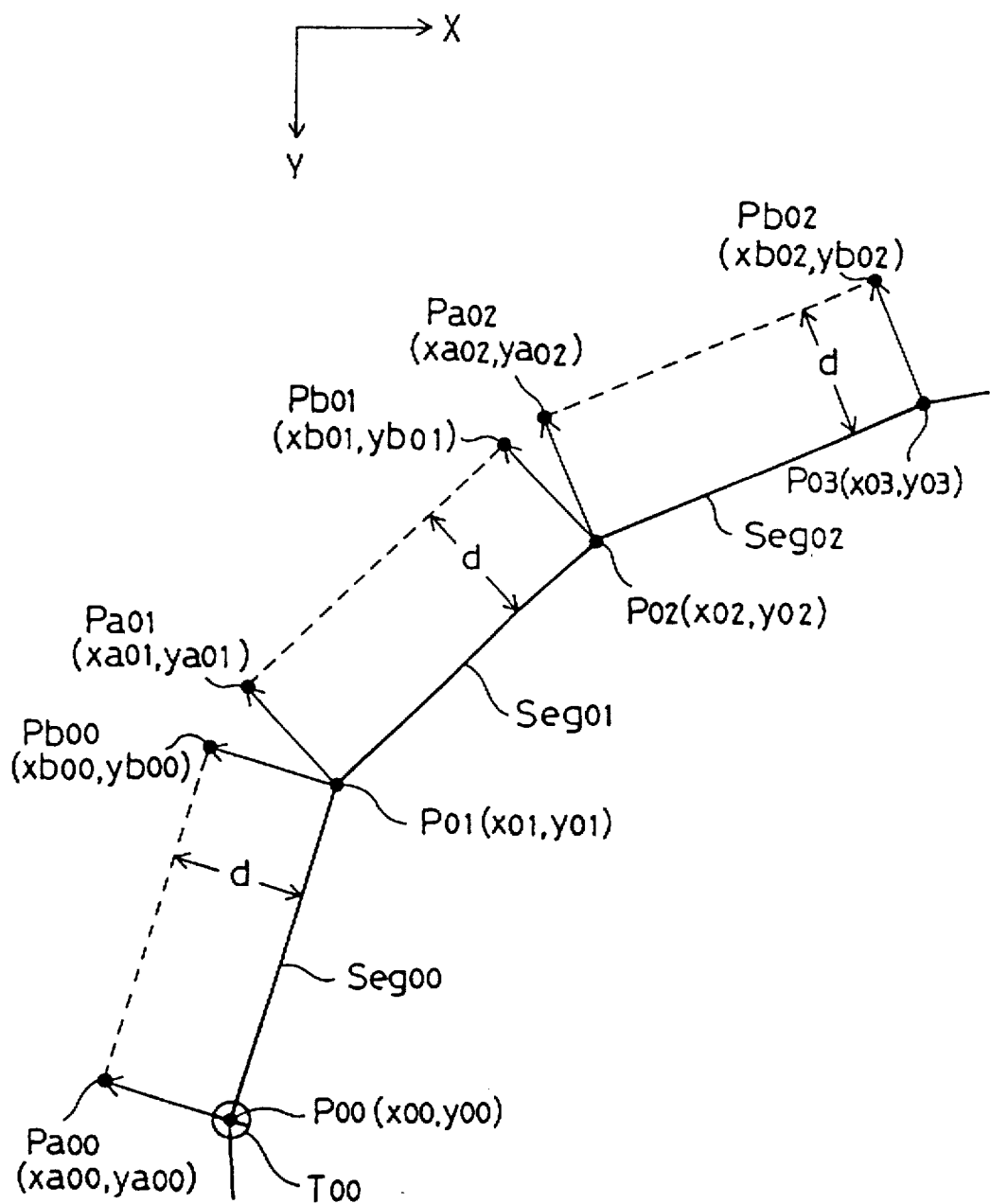
FIG. 6 is an explanatory diagram showing the processing procedure for the combination of separate segments according to the first embodiment.

Therefore, in step 2100, as the new segment, the coordinate data of segment SEG00 are first retrieved. Coordinate data includes the start point coordinates and end point coordinates. FIG. 6 which is an enlargement of the main part of FIG. 5 shows coordinates (x00,y00) of the start point P00 and coordinates (x01,y01) of the end point P01. Step 2200 performs the parallel translation of these two coordinates (x00,y00) and (x01,y01) by a predetermined distance d. In other words, coordinates (xa00,ya00) of boundary start point Pa00 and coordinates (xb00,yb00) of boundary end point Pb00 are derived after parallel translation of the segment by a predetermined distance to the left. The coordinate transformation after parallel translation is executed using simple computations by computing the inclination of segment SEG00 based on start point P00 (x00, y00) and P01 (x01, y01).

Next, step 2300 determines if segment SEG00 is the front segment or not. Because each process for each road having the particular road code is executed with the first segment to be processed as the front segment, like segment SEG00, if a segment is the first segment to be processed, step 2300 gives an affirmative answer.

After step 2300 determines that a segment is the front segment, then step 2900 provides the boundary start point coordinates of that segment computed in step 2200 to the RAM 12 which stores the traffic display data. As shown in FIG. 6, since the coordinates of the boundary start point Pa00 are (xa00, ya00), then these values are stored as an X, Y coordinate pair in the RAM region which stores traffic display data.

Next, step 3000 stores the coordinates of the boundary start and boundary end points, and the orientation of the present segment in the corresponding storage regions of the boundary start and boundary end points, and the orientation of the previous segment. In the example shown in FIG. 6, boundary start point Pa00 coordinates (xa00,ya00) and boundary end point Pb00 coordinates (xb00,yb00) are stored as the corresponding boundary start and end points coordinates of the previous segment.

Next, step 3100 determines if there are more road segments. If there are still some segments left, control goes back again to step 2100 and new segment coordinate data are retrieved. In the example shown in FIG. 6, coordinates (x01,y01) of start point P01 and coordinates (x02,y02) of end point P02 of segment Seg01 are acquired. Here, since the start point coordinates of each of the segments from the second segment Seg01 to Seg12 are the same as the end point coordinates of the respective previous segment SEG00 to Seg11, storing the previous end point coordinates as the present start point coordinates eliminates the necessity of reading the start point coordinates from the map data.

Next, in the same manner as explained above, boundary start point Pa01 coordinate (xa01,ya01) and boundary end point Pb01 coordinate (xb01,yb01) are derived in step 2200 after parallel translation by a predetermined distance d of start point coordinate (x01,y01) and end point coordinate (x02,y02) of segment Seg01. Next, step 2300 gives a negative decision since segment Seg01 is not the front segment and thus the intersection determination process of step 2350 comes next. As shown by the dotted line of FIG. 6, intersection determination involves determining whether adjacent segments intersect after their parallel translation.

Figure 4:
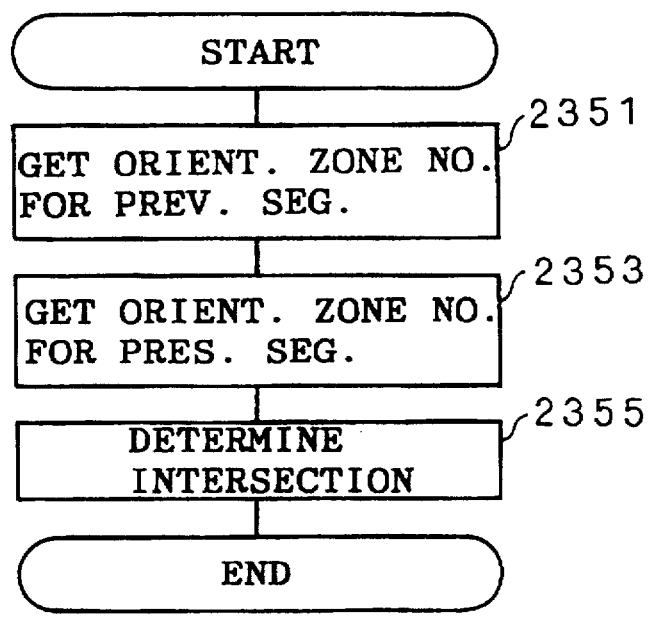
FIG. 4 is a flowchart of an intersection determination process according to the first embodiment.
Figure 8:
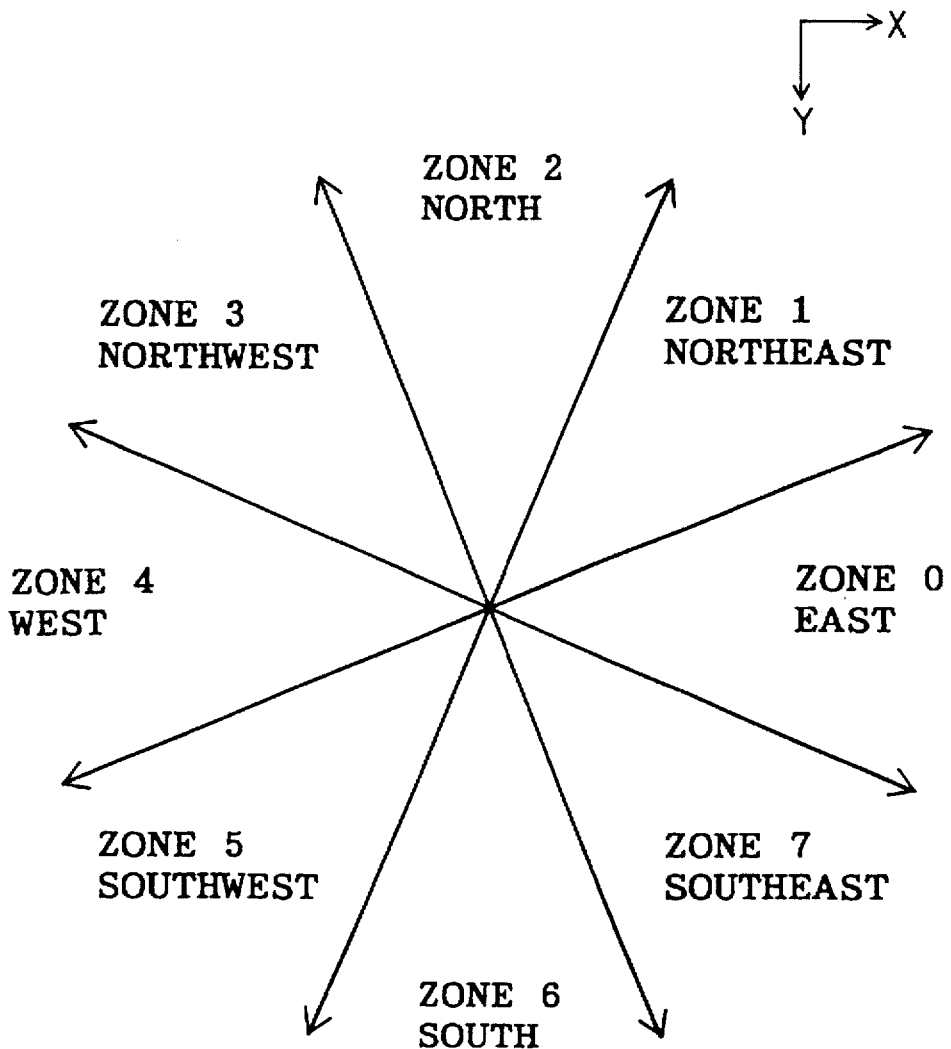
FIG. 8 is an explanatory drawing of the discrete orientation zones according to the first embodiment.

The details of this intersection determination process is shown in detail in the flowchart of FIG. 4. First, step 2351 computes an orientation zone number Dr1 of the previous segment. As shown in FIG. 8, all possible segment orientations are divided into eight zones which are east, northeast, north, northwest, west, southwest, south and southeast, and this computation procedure assigns zone numbers from 0 to 7 to segments.

This computation is performed as shown in Eqs. (1) and (2).

$$deg = arctan\ (dyn/dxn) \tag{1}$$

$$Drn = deg*8/360 + \tfrac{1}{2} \tag{2}$$

Here, the arctan function is defined over 0° to 360°, dyn is the difference in the Y components of the nth segment (for segment Seg00, it is y01−y00), dxn is the difference in the X components of the nth segment (for segment SEG00, it is x01−x00), deg is the segment angle of the nth segment and Drn is the orientation zone number of the nth segment. Here, Drn is truncated to the next lowest integer.

Computing the orientation zone number using Eqs. (1) and (2), the orientation zone number of segment Seg00 is 2. Next, step 2353 computes the orientation zone number Dr2 of the present segment in the same manner as step 2351. The orientation zone number of segment Seg01 shown in FIG. 6 is 1. However, it must be noted here that the computation in step 2351 of the orientation zone number Dr1 of the previous segment is not actually performed because that orientation zone number was computed in step 2353 of the previous control cycle and thus, the previous orientation zone number Dr2 can be assigned to the present orientation zone number Dr1 without computing Eqs. (1) and (2) therefor.

While the actual orientation of the segment is represented by the angle deg, this angle is computed in terms of eight discrete orientations to simplify the processing and the construction of the table to be explained later.

Next, in step 2355 intersection determination computation is performed. In this intersection determination computation, as shown by Eq. (3), orientation zone number difference Ddf which corresponds to the orientation difference is computed first.

$$Ddf=Dr2-Dr1 \quad (3)$$

If the result of the computation of Eq. (3) is less than zero, i.e. Ddf<0, then as shown in Eq. (4), 8 is added to Ddf.

$$Ddf=Ddf+8 \quad (4)$$

After computing orientation zone number difference Ddf, step 2400 determines if there is an intersection or not based on orientation zone number difference Ddf. Here, if $1 \leq Ddf \leq 3$, it is determined that intersection occurs, no intersection occurs for all other cases. For segments SEG00 and Seg01 of FIG. 6, using Eq. (3), Ddf=1-2=-1 and since Ddf is negative, then according to Eq. (4), Ddf=-1+8=7, and since this does not satisfy the condition $1 \leq Ddf \leq 3$, then it is determined that no intersections occur. Surely, as shown by the dotted line for the case of segments SEG00 and Seg01 of FIG. 6, segments SEG00 and Seg01 will not intersect with the original segments even after their parallel translation to the left by a predetermined distance d and on the contrary, each of the end points (boundary end point Pb00, boundary start point Pa01) tend to separate.

Therefore, step 2400 gives a negative answer and step 2500 provides the boundary end point coordinates of the previous segment to the RAM 12 region which stores the traffic display data. For the case of FIG. 6, boundary end point Pb00 coordinates (xb00, yb00) of the previous segment are stored inside the RAM 12, which stores traffic display data, in the position next to the coordinates (xa00, ya00) of the boundary start point stored previously.

Next, step 2700 determines if the orientation zone number Dr1 of the previous segment and the orientation zone number Dr2 of the present segment are equal or not. If these are equal, control is transferred to step 3000 where the coordinates of the boundary start and end points and the orientation of the present segment are stored in the storage region corresponding to the coordinates of the boundary start and end points and the orientation zone number of the previous segment. However, similar to the case of segments SEG00 and Seg01 of FIG. 6, if Dr1 is Dr2, then in the same way as step 2400, step 2800 determines if intersection occurs based on the orientation zone number calculated in step 2350 and similar to the case of segments SEG00 and Seg01 shown in FIG. 6, step 2900 stores the boundary start point coordinates of the present segment in the RAM 12 region which stores traffic display data if there are no intersections. For the example shown in FIG. 6, coordinates (xa01,ya01) of boundary start point Pa01 of segment Seg01 are stored in the RAM 12 region.

Next, in step 3000, the boundary start and end point coordinates and the orientation zone number of the present segment are stored in the storage region of RAM 12 corresponding to the boundary start and end point coordinates and the orientation zone number of the previous segment. Next, if there are still some segments left, step 3100 gives out a negative decision and processing is again repeated from step 2100.

Next, in step 2100, the coordinates of a new segment Seg02 are retrieved and after steps 2200 and 2300, step 2351 sets the orientation zone number of segment Seg01 as the orientation zone number Dr1 of the previous segment. Then, step 2353 sets the orientation zone number of segment Seg02 as the orientation zone number Dr2 of the present segment. It must be noted here that the orientation zone numbers Dr1 and Dr2 for segments Seg01 and Seg02, respectively, are both "1". Therefore, in the intersection determination computation of step 2355 using Eq. (3), Ddf=0 and thus, Eq. (4) is not computed. And because the $1 \leq Ddf \leq 3$ condition is not satisfied, step 2400 gives a negative decision. Then, in step 2500, the boundary end point coordinates of the previous segment are provided to the RAM 12 region which stores the traffic display data. Next, step 2700 determines if the orientation zone number Dr1 of the previous segment and the orientation zone number Dr2 of the present segment are equal or not, and since Dr1=Dr2, then control goes to step 3000 while skipping steps 2800 and 2900. Then after the end of process of step 3000, step 3100 determines that there are still some segments left and control goes back again to step 2100.

Next, while segment Seg02 becomes the previous segment and segment Seg03 the present segment, since they have the same orientation zone number, the same process performed for the segment combination of Seg01 and Seg02, wherein Seg01 is the previous segment and Seg02 is the present segment, is executed. Hereinafter, the same process is repeatedly executed up to the combination wherein Seg04 is the previous segment and Seg05 is the present segment.

Next, for the combination wherein Seg05 is the previous segment and the Seg06 is the present segment, at steps 2351 and 2353 in the intersection determination process of step 2350 following steps 2100, 2200 and 2300, the orientation zone number Dr1 of previous segment Seg05 is 0 while the orientation zone number Dr2 of the present segment Seg06 is computed to be 1. Next, using Eq. 3 of step 2355, the orientation zone number difference Ddf is computed as Ddf =1-0=1. Since the orientation zone number difference Ddf >0, then Eq. 4 is not performed and step 2400 determines if intersections occur or not. Since Ddf=1, then it satisfies the $1 \leq Ddf \leq 3$ condition and thus step 2400 gives an affirmative decision and step 2550 computes an intersection transformation value while referring to an orientation-intersection transformation value table. TABLE I shows one example of an orientation-intersection transformation value table. This orientation-transformation

TABLE I

| $D_{r1}$ ↓ | $D_{r2}$ → | | | | | | |
|---|---|---|---|---|---|---|---|
| | 0 | 1 | 2 | 3 | 4 | 5 | 6 | 7 |
| 0 | — | -2, -3 | -3, -3 | -8, -3 | — | — | — | — |
| 1 | — | — | -3, -2 | -5, 0 | -8, 3 | — | — | — |
| 2 | — | — | — | -3, 2 | -3, 3 | -3, 8 | — | — |
| 3 | — | — | — | — | -2, 3 | 0, 5 | 3, 8 | — |
| 4 | — | — | — | — | — | 2, 3 | 3, 3 | 8, 3 |
| 5 | 8, -3 | — | — | — | — | — | 3, 2 | 5, 0 |
| 6 | 3, -3 | 3, -8 | — | — | — | — | — | 3, -2 |
| 7 | 2, -3 | 0, -5 | -3, -8 | — | — | — | — | — | value is for computing the intersection after transforming the coordinates of the end point of the previous segment and is set so that the predetermined distance d is three pixels long and that the boundary point is displayed at the left side of the target route. The intersection transformation value is expressed as coordinates ($\Delta x, \Delta y$) wherein $\Delta x$ is the transformation value of the X component, while $\Delta y$ is the transformation value of the Y component. This holds for all the other tables that follow.

Figure 7:
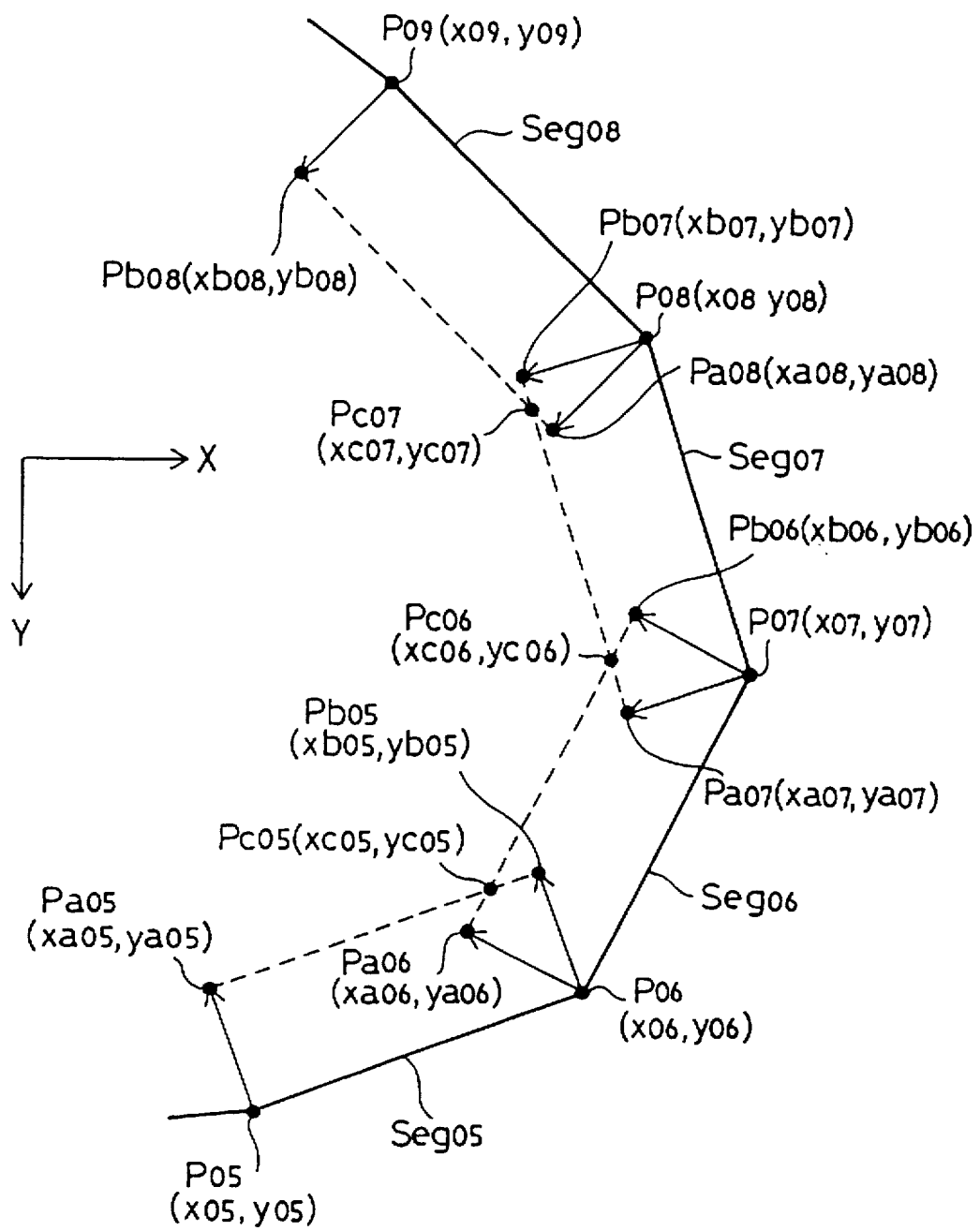
FIG. 7 is an explanatory diagram showing the processing procedure for the combination of intersecting segments according to the first embodiment.

For the combination of adjacent segments Seg05 and Seg06 shown in FIG. 7, because the orientation zone number Dr1 of segment Seg05 is 0 and the orientation zone number Dr2 of segment Seg06 is 1, then from TABLE I, (−2,−3) is derived as the intersection transformation value.

Next, in step 2570, as shown in Eqs. (5) and (6), the coordinates (x06,y06) of end point P06 of segment Seg05 (point P06 is also the start point of segment S06) are transformed by adding the intersection transformation value (−2,−3) to it to obtain coordinates (xc05,yc05) of intersection Pc05.

$$xc05=x06+(-2) \qquad (5)$$

$$yc05=y06+(-3) \qquad (6)$$

Then, in step 2600, the coordinates of the intersection computed in this way are stored in the RAM 12 region which stores traffic display data. Next, step 2700 gives out a negative decision since Dr1≠Dr2. Then, because step 2350 determined that an intersection occurs, then step 2800 gives out an affirmative decision and control is transferred to the processes of steps 3000 and 3100. If step 3100 gives out a negative decision, step 2100 is again started.

Figure 9:
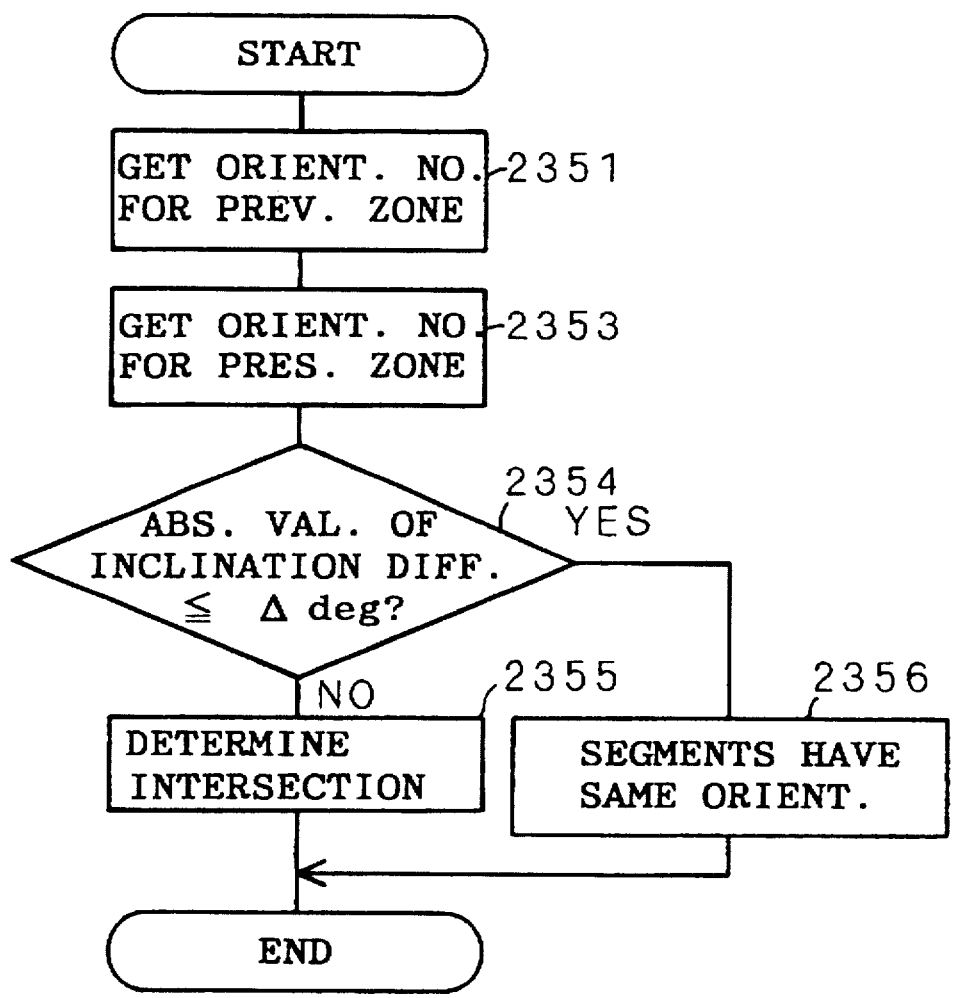
FIG. 9 is a flowchart showing an intersection point determination process according to a second embodiment of the present invention.

Next, as shown in FIG. 7, for the combination of adjacent segments Seg06 and Seg07, because orientation zone number Dr1 of segment Seg06 is 1 and orientation zone number Dr2 of segment Seg07 is 2, step 2550 derives (−3,−2) as the intersection transformation value from the table shown in FIG. 9.

Then, step 2570 computes coordinates (xc06,yc06) of intersection point Pc06 for endpoint P07 of segment Seg06 by adding intersection transformation value (−3,−2) in a manner similar to Eqs. (5) and (6). Step 2600 then provides the coordinates (xc06,yc06) of this intersection point Pc06 to the RAM 12 region which stores the traffic display data.

Next, as shown in FIG. 7, for the combination of adjacent segments Seg07 and Seg08, because orientation zone number Dr1 of segment Seg07 is 2 and orientation zone number Dr2 of segment Seg08 is 3, step 2550 derives (−3,2) as the intersection transformation value from the table shown in TABLE I.

Then, step 2570 computes coordinates (xc07,yc07) of intersection point Pc07 for endpoint P08 of segment Seg07 by adding intersection transformation value (−3,2) in a manner similar to Eqs. (5) and (6). Step 2600 then provides the coordinates (xc07,yc07) of this intersection point Pc07 to the RAM 12 region which stores the traffic display data.

Hereafter, as in the above, if step 2400 determines that intersections occur, step 2550 computes the intersection point transformation value from the orientation-intersection point transformation value table of TABLE I based on the combination of adjacent segments having orientations that intersect. Then based on this intersection transformation value, step 2570 transforms the end point coordinate of the previous segment to compute the intersection point with step 2600 generating this intersection coordinate data as the traffic display coordinate data. Here, the blanks in TABLE I represent combinations wherein intersections do not occur.

Also, as explained before, for adjacent segments which have orientation zone numbers from among combinations that do not intersect, step 2500 generates only the boundary end point of the segment as the traffic display data. Furthermore, for adjacent segments which do not intersect and which do not have the same orientation zone number, step 2500, which is the generation process for the boundary end point coordinates of the previous segment, and step 2900, which is the generation process for the boundary start point coordinates of the present segment, are executed and both boundary end point coordinate of the previous segment and boundary start point coordinate of the present segment are generated sequentially as the traffic display coordinate data.

The processing procedure proceeds like this and when the combination is the last combination which is that of segment Seg11 as the previous segment and segment Seg12 as the present segment, then with the orientation zone number Dr1 of segment Seg11 equal to 2 and the orientation zone number Dr2 of segment Seg12 equal to 3, Ddf becomes 7, and because this Ddf does not satisfy the 1≦Ddf≦7 condition, then the processes for a pair of segments which do not intersect and do not have the same orientation zone numbers is performed. Then, control proceeds to step 3100 which gives an affirmative decision since no segment is left, and then step 3200 generates the boundary end point coordinates of the present segment Seg 12 as the traffic display coordinate data.

In this way, the generation of coordinates for the traffic display of one traffic road finishes. Next, step 3300 determines if a traffic road exists or not. If there is a road that needs to be processed, control goes back to step 2100 and the processes described above are performed for the segments of that road to generate traffic display coordinate data.

As a result of processing road 100 of FIG. 5, traffic display coordinate data marked in white circles is derived and if these coordinate data are connected using a display process not shown, the traffic display is displayed as a series of chain lines located at almost the same distance away from the left side of the target road, and thus a display of good visibility is achieved.

Furthermore, the orientation zone number computation processes of steps 2351 and 2353 simply specify the orientation and are very simple. Also, the intersection determination computation of step 2355 is for determining if the orientations of the combination intersect or not, and is very simple because it does not involve the computation of the intersection point.

Furthermore, steps 2550 and 2570 which are processes that determine the intersection point are not processes involving detailed mathematical computations. First, step 2550 determines the intersection point transformation value from the general combination of adjacent segments having two orientations using the orientation-intersection transformation value table. Based on the general combination of adjacent segments having two orientations, this table is provided beforehand for determining the intersection transformation value for computing the intersection point that results after the parallel translation of each of the segments to each of the traffic display positions. Furthermore, this table does not require a large amount of memory for storage since it is small and simple.

Based on this intersection transformation value, the coordinates which correspond to the actual intersection are derived by performing simple transformation operations shown in Eqs. (5) and (6) on the coordinates of one of two end points of the common border of the adjacent zones which in this embodiment are the end point coordinates of the previous segment. In this way, a display of good visibility is implemented without burdening the navigation apparatus and increasing the amount of memory needed.

FIG. 9 shows the intersection determination process according to a second embodiment. The explanations for the processes of steps 2351, 2353 and 2355 are omitted since these processes are similar to the intersection determination process of the first embodiment shown in FIG. 4. In steps 2351 and 2353, after the computation of the orientation zone number Dr1 of the previous segment and the orientation zone number Dr2 of the present segment using Eqs. (1) and (2), step 2354 determines if the absolute value of the angular difference between the inclination deg of the previous segment and the inclination deg of the present segment computed using Eq. (1) falls below a predetermined angular difference Δdeg. As explained before, here, the angle deg represents the actual orientation before transformation to the discrete orientation.

If the absolute value of the angular difference between the inclination deg of the previous segment and the inclination deg of the present segment falls below the predetermined angular difference Adeg, step 2356 determines that both previous and present segments have the same orientation and thus the intersection determination procedure terminates. Therefore, the process of step 2400 gives a negative decision which causes step 2500 to be executed. Then, step 2700 gives an affirmative decision which causes step 2900 to be skipped.

If step 2354 gives a negative decision, the succeeding processes to be executed are the same as to those of the first embodiment.

Based on the decision of step 2354, the present embodiment avoids deciding that orientations are different, as in the process of the first embodiment which decides on discrete orientations, even though there are actually just minute differences. Thus, a more orderly traffic display of good visibility is implemented.

Similarly, this embodiment avoids deciding that orientations are the same, even though they may be within the same orientation zone but widely spaced apart at opposite sides thereof.

For the present embodiment, in addition to steps 2355, 2440, 2700 and 2800, steps 2354 and 2356 correspond to the intersection/separation state determination unit.

Figure 10:
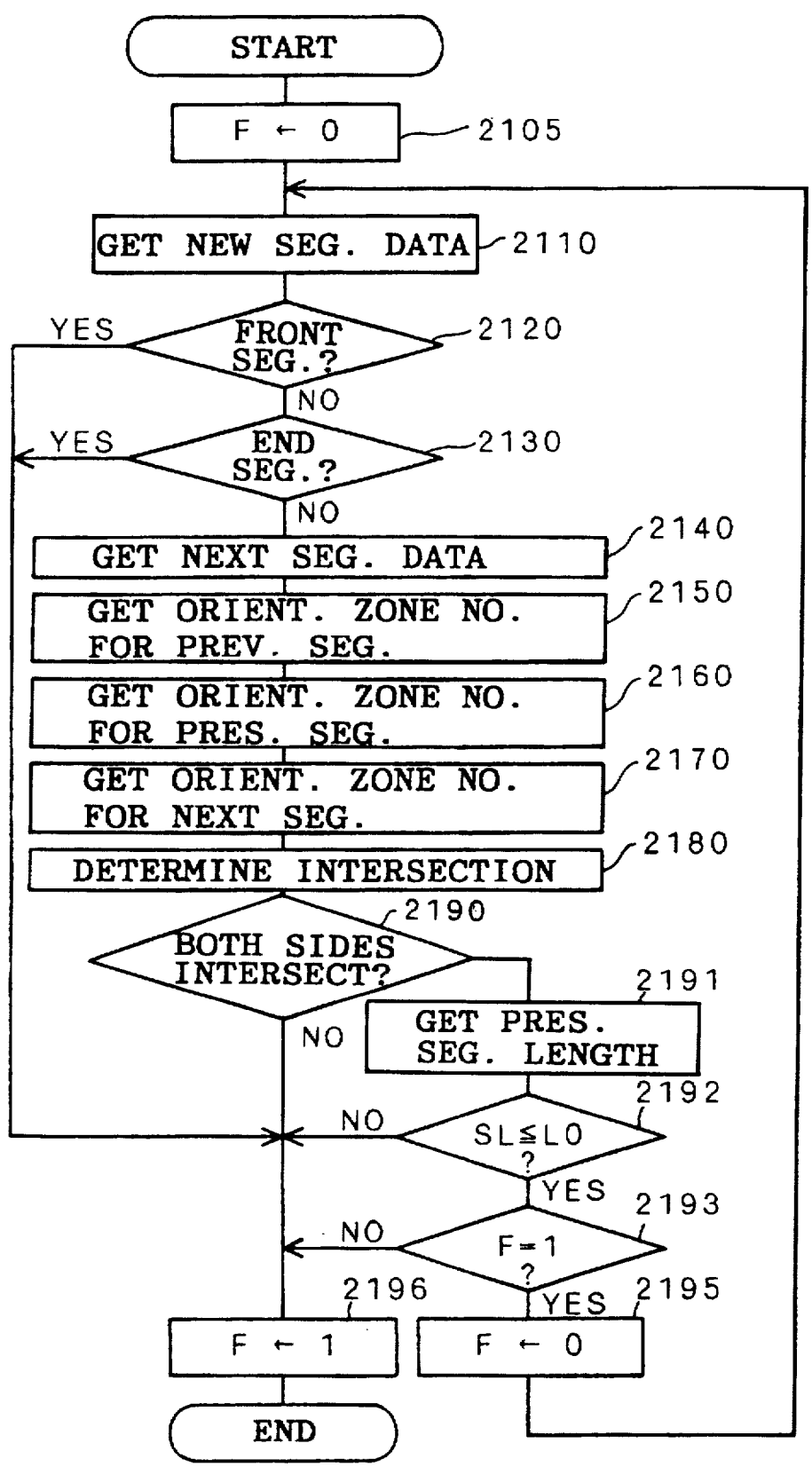
FIG. 10 is a flowchart showing a segment data acquisition process according to a third embodiment of the present invention.

FIG. 10 shows the segment data acquisition section according to a third embodiment. This segment data acquisition section is used in place of the process of step 2100 in the first and second embodiments. The explanation for the other processes is omitted because these other processes are the same as those in the first and second embodiments.

First, step 2105 resets segment concealment allowance flag F. Then, similar to step 2100, step 2110 executes the process of acquiring new segment coordinate data. Next, similar to step 2300, step 2120 determines if the present segment is the front segment or not. If it is not the front segment then step 2130 determines if it is the end segment. The end segment is the last segment of the road and corresponds to segment Seg12 of FIG. 5.

If the segment is not the end segment, step 2140 retrieves the coordinate data of the segment next to the present segment whose coordinate data was retrieved in step 2110.

Then, in the same manner as Eqs. (1) and (2) of the first embodiment, step 2150 computes orientation zone number Drn-1 of the previous segment, step 2160 computes orientation zone number Drn of the present segment and step 2170 computes orientation zone number Drn+1 of the next segment.

Next, using these three orientation zone numbers Drn-1, Drn and Drn+1, step 2180 performs both side intersection determination computation. This computation procedure computes two orientation zone number differences Ddf to determine, as in the above steps 2355 and 2400, if the present segment intersects both the previous and next segments. In other words, for the above three orientation zone numbers Drn-1, Drn and Drn+1, two orientation zone number differences Ddf are determined by performing the same process as that of step 2355 for the orientation zone numbers Drn-1 and Drn of the previous and present segments, and by performing the same process as that of step 2355 for the orientation zone numbers Drn and Drn+1 of the present and next segments.

Next, step 2190 evaluates these two orientation zone number differences Ddf and determines if intersections occurs at both sides of the present segment. If both of the orientation zone number differences Ddf satisfy the $1 \leq Ddf \leq 3$ condition, then it is determined that intersections occur at both sides and otherwise it is decided that intersections do not occur at both sides.

If step 2190 determines that there are intersections at both sides, step 2991 determines length SL of the present segment from its start and end points. Next, step 2192 determines if segment length SL is shorter than a predetermined length L0. If segment length SL is shorter than the predetermined length L0, step 2195 checks if segment concealment allowance flag F is set or not. Step 2193 resets segment concealment flag F if it is set. Then, control goes back to step 2110 and coordinate data of the new segment are retrieved. For this case, since the next segment retrieved in step 2140 is the same segment here, there is no need to retrieve new data from RAM 12, and thus data retrieved in step 2140 is used as is.

To get away from the process of FIG. 10 and go to the process of step 2200, any of the following must hold: step 2120 or step 2130 gives a positive decision, step 2190 gives a negative decision, step 2192 determines that SL>L0 even if step 2190 determines that there are no intersections at both sides, or step 2193 determines that segment concealment allowance flag F is reset.

If step 2193 determines that segment concealment allowance flag F is set, step 2195 resets segment concealment allowance flag F, control returns to the process of step 2110 and a new segment is retrieved, i.e., the present segment advances to the next segment. In other words, if the segment intersects at both sides and has a segment length equal or shorter to predetermined length L0, then for step 2200 and the steps that follow step 2200, the segment is considered as non-existent and is concealed.

If a segment has intersections with both segments on both sides of it after parallel translation of each of the segments to the display position of the traffic display, in other words, if a segments has segments on both sides that are curved inward, then if the length of such segment is equal or shorter than predetermined length L0, after parallel translation of each of the segments on both sides, the space between the points of intersection and the segments on both sides becomes narrower, and the length of the segment at the display position becomes much shorter or becomes zero. Therefore, if steps 2180, 2190, 2191 and 2192 detect these conditions, the generation of unnecessary coordinates is prevented, or to simplify the coordinates, the process in step 2200 considers the segment as non-existent. With this, traffic display is easier to see and the processing is faster.

However, if there is a sequence of segments like this, then concealing all of these segments results in an abnormality in the traffic display, and thus, step 2195 resets segment concealment allowance flag F and step 2196 sets the same flag to prevent concealment of consecutive segments.

Figure 11:
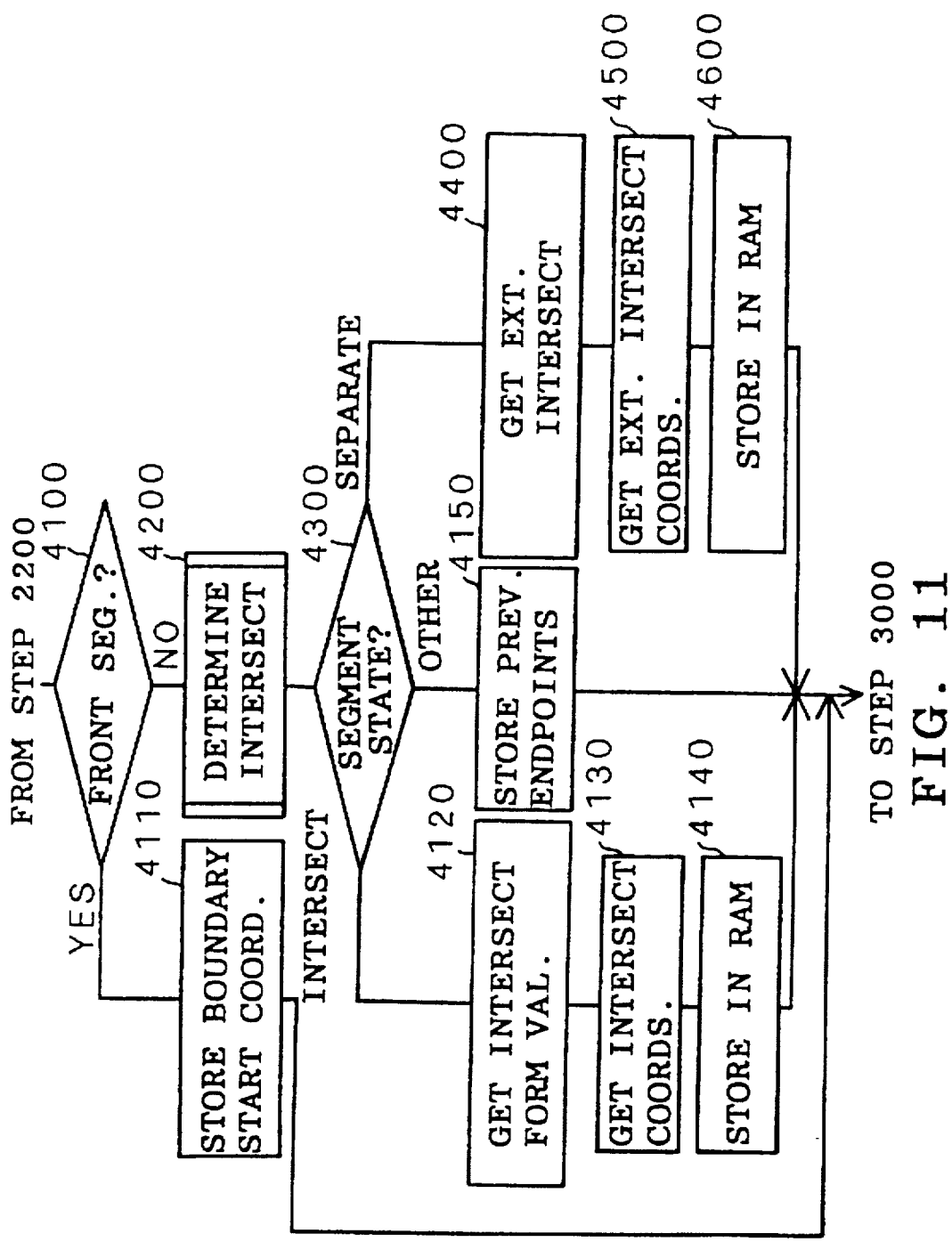
FIG. 11 is a flowchart showing a part of a traffic display data generation process according to a fourth embodiment of the present invention.

FIG. 11 shows the traffic display data generation process according to a fourth embodiment. While FIG. 11 shows only the processes from step 2200 to step 3000, the processes other than these are the same as those of FIG. 3. Also, explanation is omitted for these processes since they are the same as those in the first, second and third embodiments.

First, after step 2200, step 4100 determines if the segment is the front segment. This determination is similar to the process of step 2300 of FIG. 3. If the segment is the front segment, step 4110 generates its boundary start point coordinates. This process is the same as the process of step 2900 in FIG. 3. Then, step 3000 comes next.

If step 4100 determines that the present segment is not the front segment, step 4200 which is part of the intersection/separated state determination section is executed. This process is the same as the process of step 2350 in FIG. 3.

Next, step 4300 which is the intersection/separation state determination process is executed. Based on the orientation zone number difference Ddf, this process determines that intersections occur if Ddf satisfies the $1 \leq Ddf \leq 3$ condition, that separations occur if Ddf satisfies the $5 \leq Ddf \leq 7$ condition, and that there are no intersections nor separations if Ddf=0. Normally, there is no sharply curved road that has a Ddf that is 4, and in case Ddf is 4, then, an error is determined to have occurred and control immediately goes back to the process of step 2100.

If step 4300 determines that intersections occur, then step 4120 determines the intersection transformation value based on the orientation-intersection transformation value table of TABLE I, step 4130 computes the coordinates of the intersection, step 4140 provides the computed coordinates of the intersection to the RAM 12 region which stores traffic display data and then, step 3000 comes next. The processes of steps 4120, 4130 and 4140 are the same as those of steps 2550, 2570 and 2600, respectively.

If step 4300 determines cases other than the above, step 4150 provides the boundary end point coordinates of the previous segment to the RAM 12 region which stores traffic display data and control proceeds to step 3000. This process is the same as that of step 2500 of FIG. 3.

If step 4300 determines separation, step 4400 determines an extended intersection transformation value using an orientation-extended intersection transformation value table. One example of the intersection-extended intersection transformation value table is shown in TABLE II. The extended intersection transformation value is for transforming the end point coordinate of the previous segment to obtain the intersection point and is set-up with the assumption that the above predetermined distance d is three pixels long from the left side of the target road on the display unit 14.

Figure 12:
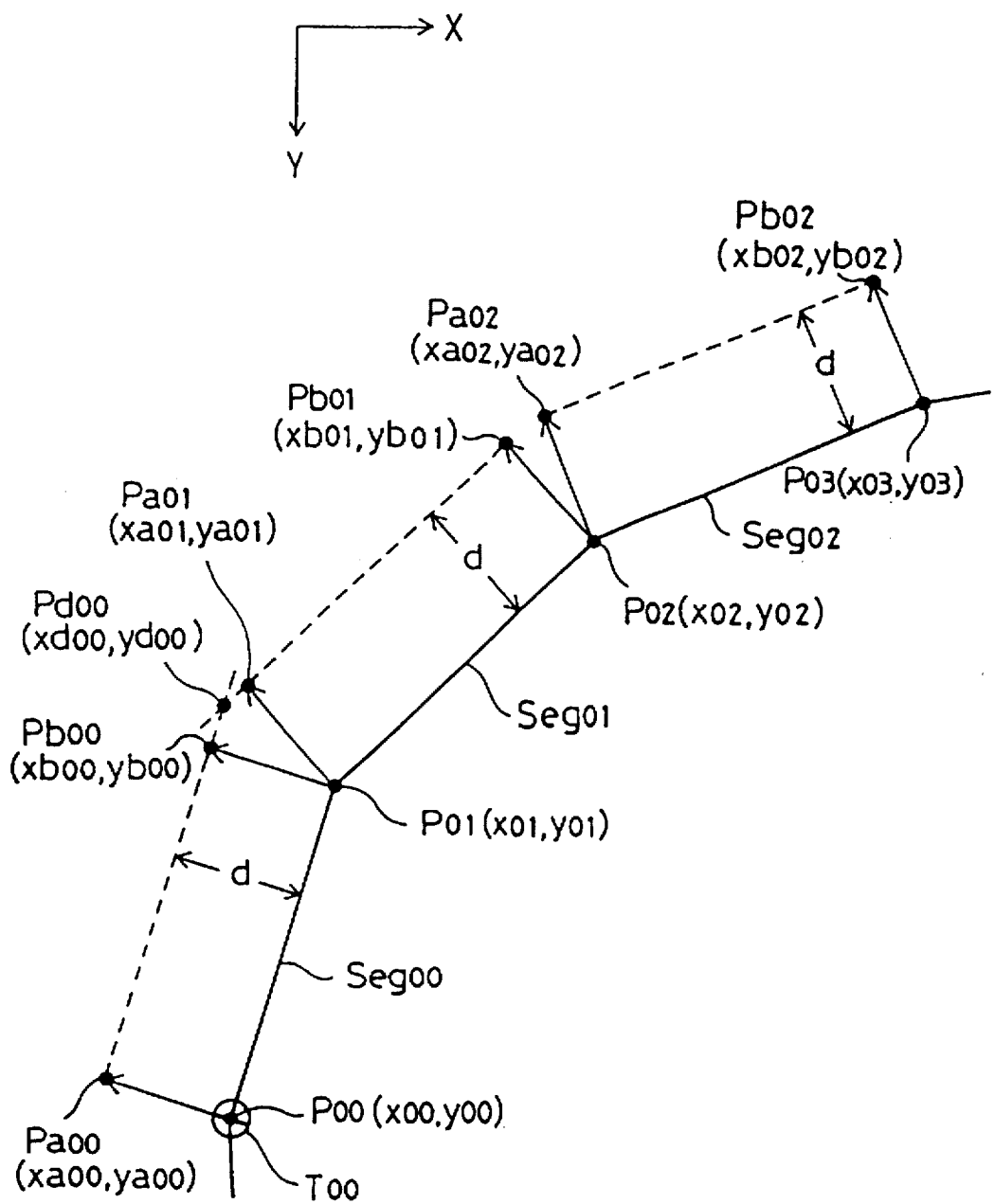
FIG. 12 is an explanatory drawing showing an extended intersection point setting process for the combination of separate segments according to the fourth embodiment.

FIG. 12 shows the process for the case when segment positions are the same as in FIG. 6. For the combination of segments SEG00 and Seg01, because orientation zone number Dr1 of segment SEG00 is 2 and orientation zone number Dr2 of segment Seg01 is 1, then orientation zone number difference Ddf is Ddf=1–2+8=7, and from TABLE II, (–3, –2) is derived as the extended intersection transformation value.

Next, in the same manner as Eqs. (7) and (8), step 4500 computes coordinates (xd00,yd00) of extended intersection Pd00 by adding extended intersection transformation value (–3,–2) to coordinates (x01,y01) of end point P01 of previous segment SEG00.

$$xd00 = x01 + (-3) \quad (7)$$

$$yd00 = y01 + (-2) \quad (8)$$

Step 4600 provides the coordinates of the extended intersection to the RAM 12 region which stores traffic display data. Then, control proceeds to step 3000.

Next is the combination of adjacent segments Seg01 and Seg02. Because orientation zone number Dr1 of segment Seg01 is 1, orientation zone number Dr2 of segment Seg02 is 1 and orientation zone number difference Ddf is Ddf=1–1=0, then this corresponds to "all the other cases", and thus step 4150 is executed. In other words, coordinates (xb01, yb01) of the boundary end point Pb01 of the previous segment is provided to the RAM 12 region which stores traffic display data.

The present embodiment computes the extended intersection transformation value using the orientation-extended intersection transformation table of TABLE II and generates the coordinates of the endpoint of the previous segment as the traffic display data after transforming such coordinates using the extended intersection transformation value. Accordingly, the orientation-intersection transformation value table of TABLE I for the simple intersection and the orientation-extended intersection transformation value table of TABLE II are united, and the processes of steps 4120 and 4400 for computing the transformation value using the table, steps 4130 and 4500 for computing the intersection (extended intersection) and steps 4140 and 4600 for generating the intersection (extended intersection) may be generalized to economize on memory for storing the various programs of the processing side and the various predetermined values, thus leading to the simplification of the device.

TABLE II

| $D_{r1}$ ↓ | $D_{r2}$ → | | | | | | | |
|---|---|---|---|---|---|---|---|---|
| | 0 | 1 | 2 | 3 | 4 | 5 | 6 | 7 |
| 0 | — | — | — | — | — | 8, –3 | 3, –3 | 2, –3 |
| 1 | –2, –3 | — | — | — | — | — | 3, –8 | 0, –5 |
| 2 | –3, –3 | –3, –2 | — | — | — | — | — | –3, –8 |
| 3 | –8, –3 | –5, 0 | –3, 2 | — | — | — | — | — |
| 4 | — | –8, 3 | –3, 3 | –2, 3 | — | — | — | — |
| 5 | — | — | –3, 8 | 0, 5 | 2, 3 | — | — | — |
| 6 | — | — | — | 3, 8 | 3, 3 | 3, 2 | — | — |
| 7 | — | — | — | — | 8, 3 | 5, 0 | 3, –2 | — |

Figure 13:
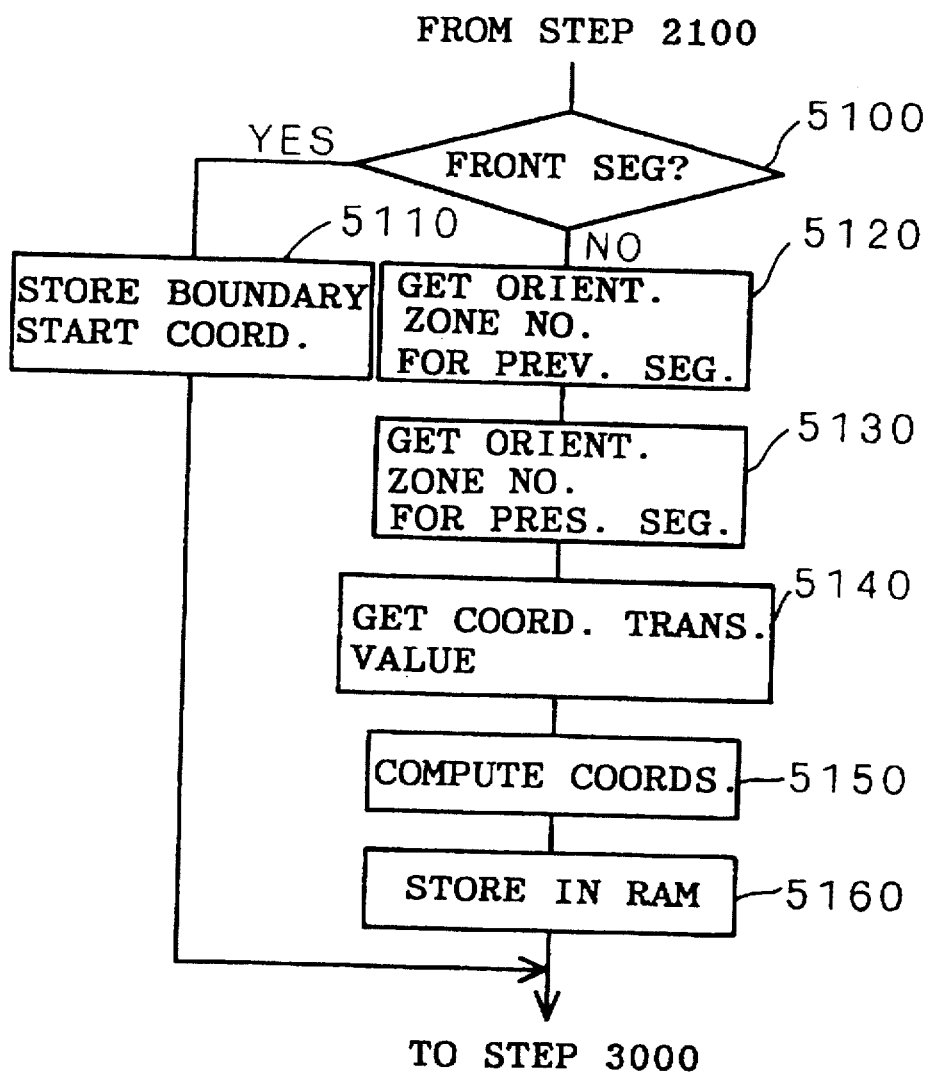
FIG. 13 is a flowchart showing part of the traffic display data generation process according to a fifth embodiment.

FIG. 13 shows the traffic display data generation process according to a fifth embodiment. The flowchart of FIG. 13 shows only the part following after step 2100 leading up to before step 3000. The difference here compared with the other processes is that step 3000 sets the orientation of the previous segment as the orientation of the present segment and that step 3000 computes the boundary end point of the present segment and generates this boundary end point as the coordinate data for traffic display. The other steps are the same as those of FIG. 12. The explanation for the other processes is omitted since these are the same as in the first, second and third embodiments.

First, after step 2100, step 5100 determines if the present segment is the front segment. This determination procedure is the same as that of the procedure of step 2300. If the present segment is the front segment, step 5110 generates the boundary start point coordinates of this present segment. Then, step 3000 comes next.

If step 5100 determines that the present segment is not the front segment, then step 5120 computes the orientation zone number Dr1 of the previous segment using Eqs. (1) and (2) and step 5130 computes the orientation zone number Dr2 of the present segment using Eqs. (1) and (2). These processes are the same as that of steps 2351 and 2353.

Next, step 5140 determines the coordinate transformation value for the combination of orientation zone number Dr1 of the previous segment and orientation zone number Dr2 of the present segment by referring to the orientation-coordinate transformation value table shown in TABLE III. This orientation-coordinate transformation value table unifies the orientation-coordinate transformation value tables of TABLES I and II into one table which includes the case when there are no intersections nor separations, in other words, this table includes the coordinate transformation values for the case when the adjacent segments have the same orientation.

After generating the boundary end point of the last segment of step 3200 shown in FIG. 3 as the traffic display coordinate, an arrow sign corresponding to the inclination of the last segment is generated as the data added to the end of the last segment data and added after the last of the traffic display coordinate data. Showing the orientation of the traffic route makes the display more visible and prominent to the driver.

In addition, for any combination of segments which need not be adjacent, if the largest absolute value of the differences in their orientations (angles) is less than 90°, then the entire road is determined to be curved by less than 90°. Therefore, this kind of judgment is executed at the start of each of the traffic display processes of the traffic display data generation procedure (FIGS. 3, 11 and 13) and if the above largest absolute value of the differences in the orientations is determined to be below 90°, all the other steps of the traffic display data generation process (FIGS. 3, 11 and 13) can be executed assuming that all the segments have the same orientation. Using this method, while the visibility of the traffic display remains almost the same, traffic display data coordinates can be derived by performing only the processes of step 2500 in FIG. 3 or step 4150 of FIG. 11, and thus processing becomes faster.

The above orientation-intersection transformation value table, orientation-extended intersection transformation value

TABLE III

| $D_{r1}$ ↓ | $D_{r2}$ → | | | | | | | |
|---|---|---|---|---|---|---|---|---|
| | 0 | 1 | 2 | 3 | 4 | 5 | 6 | 7 |
| 0 | 0, −3 | −2, −3 | −3, −3 | −8, −3 | — | 8, −3 | 3, −3 | 2, −3 |
| 1 | −2, −3 | −2, −3 | −3, −2 | −5, 0 | −8, 3 | — | 3, −8 | 0, −5 |
| 2 | −3, −3 | −3, −2 | −3, 0 | −3, 2 | −3, 3 | −3, 8 | — | −3, −8 |
| 3 | −8, −3 | −5, 0 | −3, 2 | −3, 2 | −2, 3 | 0, 5 | 3, 8 | — |
| 4 | — | −8, 3 | −3, 3 | −2, 3 | 0, 3 | 2, 3 | 3, 3 | 8, 3 |
| 5 | 8, −3 | — | −3, 8 | 0, 5 | 2, 3 | 2, 3 | 3, 2 | 5, 0 |
| 6 | 3, −3 | 3, −8 | — | 3, 8 | 3, 3 | 3, 2 | 3, 0 | 3, −2 |
| 7 | 2, −3 | 0, −5 | −3, −8 | — | 8, 3 | 5, 0 | 3, −2 | 3, −2 |

Next, in the same way as Eqs. (5) and (6), step 5150 computes the traffic display coordinates by adding the coordinate transformation value to the end point coordinates of the previous segment and step 5160 provides them to the RAM 12 region which stores traffic display data.

In this embodiment, the traffic display coordinates are generated from the two orientations of adjacent segments based on the orientation-coordinate transformation value table without determining if the combination of the orientation of adjacent segments intersect, are separate or does neither. Therefore, the same process is performed for any combination of orientations of adjacent segments and thus, memory used for storing programs of the processing side and the various predetermined values is cut down and leads to simplification of the device.

By setting the coordinate transformation values for determining the boundary start and end points from the start and end point, respectively, as a table in correspondence with the eight orientations, the computation process of the boundary start/end points in step 2200 can be performed by determining the coordinate transformation value based on the orientation of the segment, and by computing the boundary start/end point by transforming the start/end point using this coordinate transformation value. For this case, the orientation computations of steps 2351 and 2353 are placed before step 2200.

table or orientation-coordinate transformation value table are based on the pixel display of display unit 14 and thus, only discrete positions are displayed. Accordingly, it is better to use transformation values adjusted to the display as actually viewed than just theoretical values.

In each of the foregoing embodiments, while the traffic display coordinates have been determined by transforming the end point of the previous segment using the orientation-intersection transformation value, orientation-extended intersection transformation value or orientation-coordinate transformation value tables, the start point of the present segment can also be transformed using transformation values from orientation-intersection transformation value, orientation-extended intersection transformation value and orientation-coordinate transformation value tables that have been set beforehand for the start point transformation.

Furthermore, orientation-intersection transformation value, orientation-extended intersection transformation value or orientation-coordinate transformation value tables can be established not for end and start points but for the boundary end and start points for transforming boundary end and start points to derive traffic display coordinates.

While the orientation has been divided into eight regions for the foregoing embodiments, the orientation zones can be subdivided if display unit 14 is of high-resolution. For example, the orientation zone can be divided into 16 or 32 regions. The more subdivisions which are made, the clearer and more visible the display becomes. If subdivision is performed, closely similarly oriented segments are regarded as having the same orientation and the traffic display data generation process (FIGS. 3, 11 and 13) is executed if the orientation difference between adjacent segments is small.

Here, it must be noted that traffic display coordinates stored in the sequence they are generated by the above steps 2500, 2600, 2900, 3200, steps 4110, 4140, 4150, 4600 or steps 5110, 5160, are displayed in an overlapping manner by the display process (corresponding to the display device) inside the control circuit 10 for display unit 14 and thus a traffic display of good visibility is implemented.

While the boundary route has been used in displaying traffic routes for the above foregoing embodiments, the boundary route can also be used to display conditions other than traffic. Examples of such are one side road construction and cruising speed controlled zones.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An apparatus for displaying a navigational map, said apparatus comprising:

location detecting means for generating electrical location signals representative of a location of a vehicle;

a navigational map memory storing navigational map data representative of segments of said navigational map;

navigational map data retrieving means for generating boundary data representative of segments of said navigational map based on said electrical location signals;

orientation zone classifying means for classifying segments represented by said boundary data into one of a plurality of zones;

endpoint transformation value calculating means for calculating an intersection point transformation value representative of an endpoint of adjacent ones of said segments based on classifications by said orientation zone classifying means;

boundary coordinate computing means for setting said intersection point transformation value as said endpoint of said adjacent segments; and a display displaying an image representative of said navigational map data and said boundary data processed by said boundary coordinate computing means.

2. The apparatus of claim 1, wherein said navigational map data retrieving means includes segment parallel transforming means for generating transformed data representative of a parallel transformation of adjacent segments of said navigational map as said boundary data.

3. The apparatus of claim 1, said display comprising boundary data connection means for displaying said boundary data processed by said boundary coordinate computing means as a series of connected points.

4. The apparatus of claim 1, further comprising:

road condition determining means for determining which roads in said map have traffic congestion;

wherein said orientation zone classifying means classifies segments corresponding to said congested roads responsive to said road condition determining means.

5. An apparatus for displaying a selected route on a navigational map so that a selected route is distinguishable from other routes, said apparatus comprising:

location detecting means for generating electrical location signals representative of a location of a vehicle;

a navigational map memory storing navigational map data representative of segments of said navigational map;

navigational map data retrieving means for retrieving data from said memory based on said electrical location signals;

segment parallel transforming means for generating transformed data representative of a parallel transformation of adjacent segments of said navigational map;

determining means for determining whether said transformed adjacent segments intersect each other;

boundary route setting means for setting a boundary route by connecting consecutive endpoints of said transformed adjacent segments when said determining means determines that said transformed adjacent segments do not intersect and by selecting an intersection of said transformed adjacent segments as an end point of said transformed adjacent segments when said determining means determines that said transformed adjacent segments intersect; and a display displaying an image representative of said navigational map data and said boundary route.

6. The apparatus of claim 5, said display comprising boundary data connection means for displaying said boundary data processed by said boundary route setting computing means as a series of connected points.

7. The apparatus of claim 5, further comprising:

road condition determining means for determining which roads in said map have traffic congestion;

wherein said segment parallel transforming means classifies segments corresponding to said congested roads responsive to said road condition determining means.

8. An apparatus for displaying a navigational map, said apparatus comprising:

location detecting means for generating electrical location signals representative of a location of a vehicle;

a navigational map memory storing navigational map data representative of segments of said navigational map;

navigational map data retrieving means for retrieving data from said memory based on said electrical location signals;

segment parallel transforming means for generating transformed data representative of a parallel transformation of adjacent segments of said navigational map;

orientation zone classifying means for classifying transformed segments represented by said transformed data into one of a plurality of zones;

intersection/separation state determining means for determining whether said adjacent ones of said transformed segments intersect one another, for determining whether said adjacent ones of said transformed segments are separate from one another, and for determining whether consecutive endpoints of said adjacent ones of said transformed segments are coincident with one another;

intersection point transformation value calculating means for calculating an intersection point transformation value representative of a point of intersection of said adjacent ones of said transformed segments based on classifications by said orientation zone classifying means;

intersection point coordinate correcting means for correcting coordinates of consecutive endpoints of said adjacent ones of said transformed segments based on said intersection point transformation value when said intersection/separation state determining means determines that said adjacent ones of said transformed segments intersect one another;

separation end point coordinate correcting means for correcting coordinates of said consecutive endpoints when said intersection/separation state determining means determines that said adjacent ones of said transformed segments are separate from one another;

coincident point coordinate computing means for setting coordinates of one of said consecutive endpoints as boundary coordinates between said adjacent ones of said transformed segments when said intersection/separation state determining means determines that said consecutive endpoints are coincident with one another; and a display displaying an image representative of said navigational map data and said transformed data processed by said intersection point coordinate computing means, said separation end point coordinate computing means and said coincident point coordinate computing means.

9. The apparatus of claim 8, further comprising:

orientation difference determining means for determining an orientation difference between orientations of said adjacent ones of said transformed segments;

wherein said intersection/separation state determining means is further for determining that said consecutive endpoints are coincident with one another when said orientation difference is less than a predetermined value.

10. The apparatus of claim 8, further comprising:

dual intersection state determining means for determining whether ones of said transformed segments adjacent to opposite ends of a selected transformed segment intersect said selected transformed segment;

segment length determining means for determining whether a length of said selected transformed segment is less than a predetermined value; and segment concealing means for inhibiting display of said selected transformed segment when said dual intersection state determining means determines that said selected transformed segment is intersected at both ends and said segment length determining means determines that said length is below said predetermined value.

11. The apparatus of claim 8, wherein said intersection point transformation value calculating means calculates said intersection point transformation value using a table providing intersection point transformation values for combinations of adjacent zones.

12. The apparatus of claim 8, said display comprising boundary data connection means for displaying said transformed data processed by said intersection point coordinate computing means, said separation end point coordinate computing means and said coincident point coordinate computing means as a series of connected points.

13. The apparatus of claim 8, further comprising:

road condition determining means for determining which roads in said map have traffic congestion;

wherein said segment parallel transforming means classifies segments corresponding to said congested roads responsive to said road condition determining means.

14. The apparatus of claim 8, further comprising:

road condition determining means for determining which roads in said map have traffic congestion;

wherein said orientation zone classifying means classifies segments corresponding to said congested roads responsive to said road condition determining means.

15. An apparatus for displaying a navigational map, said apparatus comprising:

location detecting means for generating electrical location signals representative of a location of a vehicle;

a navigational map memory storing navigational map data representative of segments of said navigational map;

navigational map data retrieving means for retrieving data from said memory based on said electrical location signals;

segment parallel transforming means for generating transformed data representative of a parallel transformation of adjacent segments of said navigational map;

orientation zone classifying means for classifying transformed segments represented by said transformed data into one of a plurality of zones;

intersection/separation state determining means for determining whether said adjacent ones of said transformed segments intersect one another, for determining whether said adjacent ones of said transformed segments are separate from one another, and for determining whether consecutive endpoints of said adjacent ones of said transformed segments are coincident with one another;

intersection point transformation value calculating means for calculating an intersection point transformation value representative of a point of intersection of said adjacent ones of said transformed segments based on classifications by said orientation zone classifying means;

intersection point coordinate correcting means for correcting coordinates of consecutive endpoints of said adjacent ones of said transformed segments based on said intersection point transformation value when said intersection/separation state determining means determines that said adjacent ones of said transformed segments intersect one another;

extended point transformation value detecting means for determining an extended intersection point transformation value of said adjacent ones of said transformed segments when said intersection/separation state determining means determines that said adjacent ones of said transformed segments are separate from one another;

extended point coordinate computing means for transforming coordinates of one of said consecutive endpoints using said extended intersection point transformation value and for using said transformed coordinates as boundary coordinates between said adjacent ones of said transformed segments;

coincident point coordinate computing means for setting coordinates of one of said consecutive endpoints as boundary coordinates between said adjacent ones of said transformed segments when said intersection/separation state determining means determines that said consecutive endpoints are coincident with one another; and a display displaying an image representative of said navigational map data and said transformed data processed by said intersection point coordinate computing means, said separation end point coordinate computing means and said coincident point coordinate computing means.

16. The apparatus of claim 15, further comprising:

orientation difference determining means for determining an orientation difference between orientations of said adjacent ones of said transformed segments;

wherein said intersection/separation state determining means is further for determining that said consecutive endpoints are coincident with one another when said orientation difference is less than a predetermined value.

17. The apparatus of claim 15, further comprising:

dual intersection state determining means for determining whether ones of said transformed segments adjacent to opposite ends of a selected transformed segment intersect said selected transformed segment;

segment length determining means for determining whether a length of said selected transformed segment is less than a predetermined value; and segment concealing means for inhibiting display of said selected transformed segment when said dual intersection state determining means determines that said selected transformed segment is intersected at both ends and said segment length determining means determines that said length is below said predetermined value.

18. The apparatus of claim 15, wherein said intersection point transformation value calculating means calculates said intersection point transformation value using a table providing intersection point transformation values for combinations of adjacent zones.

19. The apparatus of claim 15, said display comprising boundary data connection means for displaying said transformed data processed by said boundary coordinate computing means processed by said intersection point coordinate computing means, said separation end point coordinate computing means and said coincident point coordinate computing means as a series of connected points.

20. The apparatus of claim 15, further comprising:

road condition determining means for determining which roads in said map have traffic congestion;

wherein said segment parallel transforming means classifies segments corresponding to said congested roads responsive to said road condition determining means.

21. The apparatus of claim 15, further comprising:

road condition determining means for determining which roads in said map have traffic congestion;

wherein said orientation zone classifying means classifies segments corresponding to said congested roads responsive to said road condition determining means.

* * * * *